(12) United States Patent
Pehlke et al.

(10) Patent No.: US 11,736,140 B2
(45) Date of Patent: Aug. 22, 2023

(54) MIXED SIGNAL LOW NOISE INTERFERENCE CANCELLATION

(71) Applicant: Skyworks Solutions, Inc., Irvine, CA (US)

(72) Inventors: David Richard Pehlke, Westlake Village, CA (US); Anand Raghavan, Irvine, CA (US); Poul Olesen, Stoevring (DK); Werner Schelmbauer, Steyr (AT); Thorsten Tracht, Munich (DE); Wolfgang Thomann, Munich (DE); Amir Israel Rubin, Kiryat Ono (IL); Assi Jakoby, Raanana (IL); Ofer Benjamin, Petach Tikva (IL)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 16/948,549

(22) Filed: Sep. 23, 2020

(65) Prior Publication Data
US 2021/0099199 A1 Apr. 1, 2021

Related U.S. Application Data

(60) Provisional application No. 62/906,917, filed on Sep. 27, 2019.

(51) Int. Cl.
*H04B 1/525* (2015.01)
*H04B 1/10* (2006.01)
(Continued)

(52) U.S. Cl.
CPC ............ *H04B 1/525* (2013.01); *H04B 1/0475* (2013.01); *H04B 1/1027* (2013.01); *H04B 1/123* (2013.01); *H04B 7/0413* (2013.01)

(58) Field of Classification Search
CPC .......... H04B 1/04; H04B 1/0475; H04B 1/12; H04B 1/123; H04B 1/40; H04B 1/1027;
(Continued)

(56) References Cited

U.S. PATENT DOCUMENTS

| 4,902,992 A | 2/1990 | Rubin et al. |
| 6,101,228 A | 8/2000 | Hebron et al. |

(Continued)

FOREIGN PATENT DOCUMENTS

| CN | 101512919 | 8/2009 |
| EP | 2637313 | 9/2013 |

(Continued)

OTHER PUBLICATIONS

International Search Report and Written Opinion for International Application No. PCT/US2020/052245 dated Dec. 23, 2020 in 9 pages.

(Continued)

*Primary Examiner* — Quochien B Vuong
(74) *Attorney, Agent, or Firm* — Knobbe, Martens, Olson & Bear, LLP

(57) ABSTRACT

RF communication systems with interference cancellation for coexistence are provided herein. In certain embodiments, an RF communication system includes a transmitter that transmits a transmit signal through a first front end circuit, a receiver that processes a receive signal from a second front end circuit, and a feedback receiver that processes a feedback signal from the first front end circuit to generate a digital interference cancellation signal that compensates the receiver for interference arising from the transmitter.

20 Claims, 16 Drawing Sheets

(51) Int. Cl.
*H04B 7/0413* (2017.01)
*H04B 1/04* (2006.01)
*H04B 1/12* (2006.01)

(58) Field of Classification Search
CPC .... H04B 1/525; H04B 7/0413; H04B 7/0473; H04B 7/08; H04B 7/15585; H04B 15/00; H04W 72/042; H04W 72/082; H04W 84/12; H04W 88/02; H04W 88/06
See application file for complete search history.

(56) References Cited

U.S. PATENT DOCUMENTS

| | | | |
|---|---|---|---|
| 6,226,322 B1 | 5/2001 | Mukherjee | |
| 6,539,068 B2 | 3/2003 | Hebron et al. | |
| 6,965,657 B1 * | 11/2005 | Rezvani | H04B 3/32 |
| | | | 375/346 |
| 7,146,133 B2 | 12/2006 | Bahl et al. | |
| 7,305,216 B2 | 12/2007 | Boos | |
| 7,412,217 B2 | 8/2008 | Boos | |
| 7,565,112 B2 | 7/2009 | Ragan | |
| 7,620,373 B2 | 11/2009 | Cole et al. | |
| 8,121,573 B2 | 2/2012 | Haralabidis et al. | |
| 8,325,865 B1 | 12/2012 | Rofougaran et al. | |
| 8,346,196 B2 | 1/2013 | Haralabidis et al. | |
| 8,553,610 B2 * | 10/2013 | Gainey | H04B 7/15585 |
| | | | 455/296 |
| 8,553,622 B2 | 10/2013 | Yang | |
| 8,599,709 B2 | 12/2013 | Chen et al. | |
| 8,681,748 B2 | 3/2014 | Medapalli et al. | |
| 8,706,032 B2 | 4/2014 | Zhang et al. | |
| 8,750,926 B2 | 6/2014 | Fu et al. | |
| 8,767,869 B2 * | 7/2014 | Rimini | H04B 1/525 |
| | | | 375/295 |
| 8,842,546 B2 | 9/2014 | Chen et al. | |
| 8,934,362 B2 | 1/2015 | Hsu et al. | |
| 8,995,321 B2 | 3/2015 | Medapalli | |
| 9,001,935 B2 | 4/2015 | Guo et al. | |
| 9,148,233 B2 | 9/2015 | Haralabidis et al. | |
| 9,191,041 B2 | 11/2015 | Mkadem et al. | |
| 9,220,046 B2 | 12/2015 | Chen et al. | |
| 9,220,072 B2 | 12/2015 | Hsu et al. | |
| 9,232,443 B2 | 1/2016 | Fu et al. | |
| 9,232,564 B2 | 1/2016 | Medapalli et al. | |
| 9,319,887 B2 | 4/2016 | Chen et al. | |
| 9,326,310 B2 | 4/2016 | Zhang et al. | |
| 9,413,473 B2 | 8/2016 | Wang et al. | |
| 9,438,284 B2 | 9/2016 | Wang et al. | |
| 9,462,528 B2 | 10/2016 | Chen et al. | |
| 9,544,813 B2 | 1/2017 | Wasily | |
| 9,648,518 B2 | 5/2017 | Chen et al. | |
| 9,722,639 B2 | 8/2017 | Khlat et al. | |
| 9,730,014 B2 | 8/2017 | Balaban et al. | |
| 9,775,147 B2 | 9/2017 | Kenney et al. | |
| 9,894,708 B2 | 2/2018 | Ko et al. | |
| 9,918,341 B2 | 3/2018 | Papaleo et al. | |
| 9,924,547 B2 | 3/2018 | Zhang et al. | |
| 9,929,849 B2 | 3/2018 | Medapalli | |
| 9,936,414 B2 | 4/2018 | Chai et al. | |
| 9,942,797 B2 | 4/2018 | Wasily | |
| 9,955,379 B2 | 4/2018 | Chen et al. | |
| 9,998,158 B2 * | 6/2018 | Smith | H04B 1/1036 |
| 10,063,292 B2 | 8/2018 | Hirsch et al. | |
| 10,172,143 B2 | 1/2019 | Gebhard | |
| 10,257,746 B2 | 4/2019 | Jain et al. | |
| 10,292,054 B2 | 5/2019 | Khojastepour et al. | |
| 10,299,135 B2 | 5/2019 | Richards et al. | |
| 10,312,976 B2 | 6/2019 | Chang et al. | |
| 10,361,835 B2 | 7/2019 | Guo et al. | |
| 10,700,766 B2 * | 6/2020 | Khandani | H04B 7/15535 |
| 10,749,565 B1 | 8/2020 | Williams | |
| 10,840,957 B2 | 11/2020 | Raghavan | |
| 10,840,958 B2 | 11/2020 | Raghavan | |
| 10,855,325 B2 | 12/2020 | Raghavan | |
| 10,992,335 B2 | 4/2021 | Elmaghraby et al. | |
| 11,082,074 B2 | 8/2021 | Choi et al. | |
| 11,265,029 B2 | 3/2022 | Raghavan | |
| 11,283,480 B2 | 3/2022 | Raghavan | |
| 11,309,927 B2 | 4/2022 | Raghavan | |
| 11,558,079 B2 | 1/2023 | Raghavan et al. | |
| 2001/0008383 A1 | 7/2001 | Nishida et al. | |
| 2001/0033119 A1 | 10/2001 | Nguyen | |
| 2003/0185309 A1 | 10/2003 | Pautler et al. | |
| 2005/0020297 A1 | 1/2005 | Axness et al. | |
| 2008/0089397 A1 | 4/2008 | Vetter et al. | |
| 2008/0181337 A1 | 7/2008 | Maxim | |
| 2008/0219377 A1 | 9/2008 | Nisbet | |
| 2009/0047914 A1 | 2/2009 | Axness et al. | |
| 2009/0161801 A1 | 6/2009 | Huang et al. | |
| 2010/0246557 A1 | 9/2010 | Ishizaki | |
| 2011/0205986 A1 | 8/2011 | Medapalli | |
| 2011/0227642 A1 | 9/2011 | Hoyerby et al. | |
| 2011/0256857 A1 | 10/2011 | Chen et al. | |
| 2012/0182896 A1 | 7/2012 | Jang et al. | |
| 2012/0214426 A1 | 8/2012 | Koller et al. | |
| 2012/0281550 A1 | 11/2012 | Huang | |
| 2013/0044791 A1 | 2/2013 | Rimini et al. | |
| 2013/0102254 A1 | 4/2013 | Cyzs et al. | |
| 2013/0114583 A1 | 5/2013 | Park et al. | |
| 2013/0259099 A1 | 10/2013 | Gudem et al. | |
| 2014/0003300 A1 | 1/2014 | Weissman et al. | |
| 2014/0161159 A1 | 6/2014 | Black et al. | |
| 2014/0194071 A1 | 7/2014 | Wyville | |
| 2014/0247757 A1 | 9/2014 | Rimini et al. | |
| 2014/0269852 A1 | 9/2014 | Pratt et al. | |
| 2014/0269858 A1 | 9/2014 | Lukashevich et al. | |
| 2014/0301498 A1 | 10/2014 | Rimini et al. | |
| 2014/0341196 A1 | 11/2014 | Liang et al. | |
| 2015/0065064 A1 | 3/2015 | Hwang et al. | |
| 2015/0126146 A1 | 5/2015 | Wang et al. | |
| 2015/0139122 A1 | 5/2015 | Rimini et al. | |
| 2015/0146583 A1 | 5/2015 | Yoon et al. | |
| 2015/0215471 A1 | 7/2015 | Ljung | |
| 2015/0280757 A1 | 10/2015 | Beidas et al. | |
| 2015/0295602 A1 | 10/2015 | Lo et al. | |
| 2016/0028375 A1 | 1/2016 | Feldman et al. | |
| 2016/0087658 A1 | 3/2016 | Weissman et al. | |
| 2016/0099733 A1 | 4/2016 | Weissman et al. | |
| 2016/0173165 A1 | 6/2016 | Choi et al. | |
| 2016/0211882 A1 | 7/2016 | Hwang et al. | |
| 2016/0242183 A1 | 8/2016 | Kang et al. | |
| 2016/0294425 A1 | 10/2016 | Hwang et al. | |
| 2016/0380706 A1 | 12/2016 | Tanzi et al. | |
| 2017/0026064 A1 | 1/2017 | Khlat et al. | |
| 2017/0063425 A1 | 3/2017 | Khlat et al. | |
| 2017/0077967 A1 | 3/2017 | Srirattana et al. | |
| 2017/0127345 A1 | 5/2017 | Ge | |
| 2017/0163295 A1 | 6/2017 | Talty et al. | |
| 2017/0187431 A1 | 6/2017 | Zhu | |
| 2017/0257136 A1 | 9/2017 | Gianvittorio et al. | |
| 2017/0288842 A1 | 10/2017 | Lim et al. | |
| 2018/0062675 A1 | 3/2018 | Pratt et al. | |
| 2018/0063745 A1 | 3/2018 | Jain et al. | |
| 2018/0083658 A1 | 3/2018 | Dor et al. | |
| 2018/0092117 A1 | 3/2018 | Azizi et al. | |
| 2018/0109243 A1 | 4/2018 | Takamine | |
| 2018/0110090 A1 | 4/2018 | Um et al. | |
| 2018/0167137 A1 | 6/2018 | Azizi et al. | |
| 2018/0175902 A1 | 6/2018 | Lakhani et al. | |
| 2018/0279370 A1 | 9/2018 | Tao et al. | |
| 2018/0317127 A1 | 11/2018 | Chen et al. | |
| 2018/0332506 A1 | 11/2018 | Manepalli et al. | |
| 2018/0368082 A1 | 12/2018 | O'Shea et al. | |
| 2019/0036563 A1 | 1/2019 | Koshy et al. | |
| 2019/0036622 A1 | 1/2019 | Lagoy et al. | |
| 2019/0215140 A1 | 7/2019 | Hafeez et al. | |
| 2019/0261412 A1 | 8/2019 | Novlan et al. | |
| 2019/0305419 A1 | 10/2019 | Ling | |
| 2020/0067563 A1 | 2/2020 | Raghavan | |
| 2020/0067606 A1 | 2/2020 | Raghavan | |
| 2020/0228159 A1 | 7/2020 | Raghavan et al. | |
| 2021/0091810 A1 | 3/2021 | Raghavan | |
| 2021/0098897 A1 | 4/2021 | Pehlke et al. | |
| 2021/0111749 A1 | 4/2021 | Raghavan | |

(56) References Cited

U.S. PATENT DOCUMENTS

| | | |
|---|---|---|
| 2021/0119654 A1 | 4/2021 | Raghavan |
| 2022/0209802 A1 | 6/2022 | Raghavan |
| 2022/0209804 A1 | 6/2022 | Raghavan |
| 2022/0239330 A1 | 7/2022 | Raghavan |
| 2022/0416837 A1 | 12/2022 | Raghavan et al. |

FOREIGN PATENT DOCUMENTS

| | | |
|---|---|---|
| EP | 2822189 | 1/2015 |
| KR | 10-2019-0026449 A | 3/2019 |
| TW | 2014-06105 | 2/2014 |
| WO | WO 2004/095763 | 11/2004 |
| WO | WO 2012/098754 | 7/2012 |
| WO | WO 2014/195830 A1 | 12/2014 |
| WO | WO 2017/036412 | 3/2017 |
| WO | WO 2020/041206 | 2/2020 |
| WO | WO 2020/041209 | 2/2020 |
| WO | WO 2020/041210 | 2/2020 |
| WO | WO 2020/041212 | 2/2020 |
| WO | WO 2021/061792 | 4/2021 |
| WO | WO 2021/061834 | 4/2021 |

OTHER PUBLICATIONS

International Search Report and Written Opinion for International Application No. PCT/US2019/047082 dated Dec. 2, 2019 in 9 pages.
International Search Report and Written Opinion for International Application No. PCT/US2019/047086 dated Dec. 2, 2019 in 10 pages.
International Search Report and Written Opinion for International Application No. PCT/US2019/047088 dated Dec. 3, 2019 in 10 pages.
International Search Report and Written Opinion for International Application No. PCT/US2019/047091 dated Dec. 3, 2019 in 10 pages.
International Search Report and Written Opinion for International Application No. PCT/US2020/052297 dated Dec. 30, 2020 in 10 pages.
International Preliminary Report and Written Opinion for International Application No. PCT/US2020/052245 dated Mar. 16, 2022, in 7 pages.
International Preliminary Report on Patentability and Written Opinion for International Application No. PCT/US2020/052297 dated Mar. 15, 2022, in 6 pages.
Pui-Ho, "Study of spectral regrowth and harmonic tuning in microwave power amplifier", Doctoral dissertation, The Chinese University of Hong Kong, https://core.ac.uk/download/pdf/48534417, accessed Aug. 22, 2022.
Van Moer, "Measure-based nonlinear modeling of spectral regrowth", IEEE Transactions on Instrumentation and Measurement, vol. 50(6):1711-1716 (2001).
Behzad, "Wireless LAN radios: System definition to transistor design", John Wiley & Sons, pp. 29-32 (2007); https://www.google.co/uk/books/edition/Wireless_LAN_Radios/d2Xznl9LApYC.
Iniewski et al., "Wireless Technologies: Circuits, Systems, and Devices", CRC Press, pp. 267-303 (2008).
Lindenmeier et al., "Electromagnetics and network theory and their microwave technology applications: A tribute to Peter Russer", Springer Science & Business Media, see Chapter 19:263 (2011).
Nelson, "Understanding adjacent channel power measurements in spectrum analysis", Microwaves & RF; available from https://www.mwrf.com/technologies/test-measurement/article/21845568/keysight-technologies-understanding-adjacent-channel-power-measurements-in-spectrum-analysis, accessed Jul. 3, 2023. See "AGP history".
Oppenheim et al., "Discrete-time signal processing", Second Edition, Chapters 1, 2, 7 Prentice Hall (1999).

\* cited by examiner

MIXED SIGNAL LOW NOISE INTERFERENCE CANCELLATION

CROSS-REFERENCE TO RELATED APPLICATIONS

This application claims the benefit of priority under 35 U.S.C. § 119 of U.S. Provisional Patent Application No. 62/906,917, filed Sep. 27, 2019 and titled "MIXED SIGNAL LOW NOISE INTERFERENCE CANCELLATION," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications in frequency range 1 (FR1).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a wireless device. The wireless device includes a plurality of front end systems including a first front end system and a second front end system. The wireless device further includes a plurality of transceivers including a first transceiver including a transmitter configured to transmit a transmit signal through the first front end system, and a second transceiver including a receiver configured to process a receive signal from the second front end system. The second transceiver further including a first feedback receiver configured to process a first feedback signal from the first front end system to generate a first digital interference cancellation signal, and to provide the first digital interference cancellation signal to the receiver for compensating the receive signal for interference arising from the transmitter.

In various embodiments, the receiver is configured to process the receive signal to generate a digital receive signal, and to generate a compensated digital receive signal based on digitally compensating the digital receive signal with the first digital interference cancellation signal. According to a number of embodiments, the wireless device further includes a decoding and detection circuit configured to process the compensated digital receive signal. In accordance with several embodiments, the receiver is configured to subtract the first digital interference signal from the digital receive signal.

In some embodiments, the first front end system provides the first feedback signal to the first feedback receiver along a feedback path, the first front end system including a multi-throw switch configured to provide the first feedback signal to the feedback path in a first mode, and to disconnect the feedback path in a second mode.

In several embodiments, the first feedback receiver corresponds to a diversity receiver, the wireless device further comprising a switch configured to provide the first feedback signal to the diversity receiver in a first mode and to provide a diversity receive signal to the diversity receiver in a second mode.

In various embodiments, the feedback receiver is dedicated to processing the first feedback signal.

In some embodiments, the first transceiver is a cellular transceiver and the second transceiver is a Wi-Fi transceiver. In a number of embodiments, the first transceiver is a Wi-Fi transceiver and the second transceiver is a cellular transceiver.

In several embodiments, the first digital interference cancellation signal compensates for interference arising from adjacent channel leakage.

In some embodiments, the first digital interference cancellation signal compensates for interference arising from harmonic interference.

In various embodiments, the first digital interference cancellation signal compensates for interference arising from intermodulation distortion.

In several embodiments, the wireless device further includes a first antenna coupled to the first front end system and a second antenna coupled to the second front end system.

In some embodiments, the wireless device further includes a common antenna coupled to the first front end system and the second front end system.

In various embodiments, the first front end system includes a filter configured to output the first feedback signal. According to a number of embodiments, the filter is configured to filter a carrier frequency of the transmit signal.

In several embodiments, the first front end system includes a diplexer configured to output the first feedback signal.

In a number of embodiments, the first front end system includes an attenuator configured to attenuate the first feedback signal.

In various embodiments, the first front end system includes a power amplifier configured to amplify the transmit signal to generate an amplified transmit signal, and a coupler and filtering circuit configured to couple a portion of the amplified transmit signal to generate a coupled signal, and to filter the coupled signal to generate the first feedback signal.

In some embodiments, the second transceiver further includes a second feedback receiver configured to process a second feedback signal from the first front end system to generate a second digital interference cancellation signal, and to provide the second digital interference cancellation signal to the receiver for compensating the receive signal for interference arising from the transmitter. According to a number of embodiments, the first feedback signal indicates harmonic interference and the second feedback signal indicated adjacent channel leakage ratio interference.

In various embodiments, the feedback receiver includes a low noise amplifier, a downconverting mixer, an analog-to-digital converter, and a digital self-interference cancellation circuit electrically connected in a cascade.

In several embodiments, the second transceiver includes a plurality of receivers including the receiver, the first interference cancellation signal operable to provide interference cancellation to a plurality of receive signals processed by the plurality of receivers. According to a number of embodiments, the plurality of receive signals correspond to a plurality of multiple-input multiple-output (MIMO) signals.

In some embodiments, the first transceiver further includes a receiver, and a second feedback receiver configured to process a second feedback signal from the second front end system to provide digital interference cancellation to the receiver of the first transceiver. According to a number of embodiments, the first transceiver is a cellular transceiver and the second transceiver is a Wi-Fi transceiver.

In certain embodiments, the present disclosure relates to a radio frequency communication system. The radio frequency communication system includes a transmit front end circuit, a transmitter configured to transmit a transmit signal through the transmit front end circuit, a receive front end circuit, a receiver configured to process a receive signal from the receive front end circuit, and a feedback receiver configured to process a feedback signal from the transmit front end circuit to generate a digital interference cancellation signal, and to provide the digital interference cancellation signal to the receiver for compensating the receive signal for interference arising from the transmitter.

In various embodiments, the receiver is configured to process the receive signal to generate a digital receive signal, and to generate a compensated digital receive signal based on digitally compensating the digital receive signal with the digital interference cancellation signal. According to a number of embodiments, the radio frequency communication system further includes a decoding and detection circuit configured to process the compensated digital receive signal.

In several embodiments, the receiver is configured to subtract the digital interference signal from the digital receive signal.

In some embodiments, the transmit front end circuit provides the feedback signal to the feedback receiver along a feedback path, the transmit front end circuit including a multi-throw switch configured to provide the feedback signal to the feedback receiver along the feedback path in a first mode, and to disconnect the feedback path in a second mode.

In a number of embodiments, the feedback receiver corresponds to a diversity receiver, the radio frequency communication system further including a switch configured to provide the feedback signal to the diversity receiver in a first mode and to provide a diversity receive signal to the diversity receiver in a second mode.

In various embodiments, the feedback receiver is dedicated to processing the feedback signal.

In some embodiments, the transmitter is a cellular transmitter and the receiver is a Wi-Fi receiver.

In various embodiments, the transmitter is a Wi-Fi transmitter and the receiver is a cellular receiver.

In a number of embodiments, the digital interference cancellation signal compensates for interference arising from adjacent channel leakage.

In some embodiments, the digital interference cancellation signal compensates for interference arising from harmonic interference.

In various embodiments, the digital interference cancellation signal compensates for interference arising from intermodulation distortion.

In several embodiments, the transmit front end circuit is coupled to a first antenna, and the receive front end circuit is coupled to a second antenna.

In some embodiments, the transmit front end circuit and the receive front end circuit are coupled to a common antenna.

In various embodiments, the transmit front end circuit includes a filter configured to output the feedback signal. According to a number of embodiments, the filter is configured to filter a carrier frequency of the transmit signal.

In several embodiments, the transmit front end circuit includes a diplexer configured to output the feedback signal.

In a number of embodiments, the transmit front end circuit includes an attenuator configured to attenuate the feedback signal.

In various embodiments, the transmit front end circuit further includes a power amplifier configured to amplify the transmit signal to generate an amplified transmit signal, and a coupler and filtering circuit configured to couple a portion of the amplified transmit signal to generate a coupled signal, and to filter the coupled signal to generate the feedback signal.

In several embodiments, the transmit front end circuit is further configured to provide a plurality of feedback signals including the feedback signal.

In a number of embodiments, the feedback receiver includes a low noise amplifier, a downconverting mixer, an analog-to-digital converter, and a digital self-interference cancellation circuit electrically connected in a cascade.

In some embodiments, the radio frequency communication system further includes a plurality of receivers including the receiver, the interference cancellation signal operable to provide interference cancellation to a plurality of receive signals processed by the plurality of receivers. According to several embodiments, the plurality of receive signals correspond to a plurality of multiple-input multiple-output (MIMO) signals.

In certain embodiments, the present disclosure relates to a method of interference cancellation in a radio frequency communication system. The method includes providing a transmit signal to a first front end system using a transmitter of a first transceiver, processing a receive signal from a second front end system using a receiver of a second transceiver, processing a first feedback signal from the first front end system to generate a first digital interference cancellation signal using a first feedback receiver of the second transceiver, and compensating the receive signal for interference arising from the transmitter using the first digital interference cancellation signal.

In various embodiments, processing the receive signal further includes generating a digital receive signal, and generating a compensated digital receive signal based on digitally compensating the digital receive signal with the first digital interference cancellation signal. According to a number of embodiments, the method further includes processing the compensated digital receive signal using a decoding and detection circuit. In accordance with several embodiments, the method further includes subtracting the first digital interference signal from the digital receive signal.

In some embodiments, the method further includes providing the first feedback signal to the first feedback receiver along a feedback path in a first mode of a switch, and disconnecting the feedback path in a second mode of the switch.

In several embodiments, the first transceiver is a cellular transceiver and the second transceiver is a Wi-Fi transceiver.

In a number of embodiments, the first transceiver is a Wi-Fi transceiver and the second transceiver is a cellular transceiver.

In various embodiments, compensating the receive signal for interference including providing compensation for adjacent channel leakage.

In several embodiments, compensating the receive signal for interference includes providing compensation for harmonic interference.

In a number of embodiments, compensating the receive signal for interference including providing compensation for intermodulation distortion.

In several embodiments, the method further includes communicating on separate antennas using the first front end system and the second front end system.

In various embodiments, the method further includes communicating on a common antenna using the first front end system and the second front end system.

In a number of embodiments, the method further includes generating the first feedback signal using a filter of the first front end system.

In some embodiments, the method further includes filtering a carrier frequency of the transmit signal using the filter.

In various embodiments, the method further includes generating the first feedback signal using a diplexer of the first front end system.

In a number of embodiments, the method further includes attenuating the first feedback signal using an attenuator of the first front end system.

In several embodiments, the method further includes amplifying the transmit signal to generate an amplified transmit signal, coupling a portion of the amplified transmit signal to generate a coupled signal, and filtering the coupled signal to generate the first feedback signal.

In some embodiments, the method further includes processing a second feedback signal from the first front end system using a second feedback receiver of the second transceiver to generate a second digital interference cancellation signal, and compensating the receive signal using the second digital interference cancellation. According to a number of embodiments, the first feedback signal indicates harmonic interference and the second feedback signal indicated adjacent channel leakage ratio interference.

In various embodiments, the second transceiver includes a plurality of receivers including the receiver, the method further comprising using the first interference cancellation signal operable to provide interference cancellation to a plurality of receive signals processed by the plurality of receivers. According to a number of embodiments, the plurality of receive signals correspond to a plurality of multiple-input multiple-output (MIMO) signals.

In several embodiments, the method further includes generating a second digital interference cancellation signal by processing a second feedback signal from the second front end system using a second feedback receiver of the first transceiver, and processing the second digital interference cancellation in the second transceiver to provide interference cancellation. According to various embodiments, the first transceiver is a cellular transceiver and the second transceiver is a Wi-Fi transceiver.

DETAILED DESCRIPTION OF EMBODIMENTS

Figure 1:
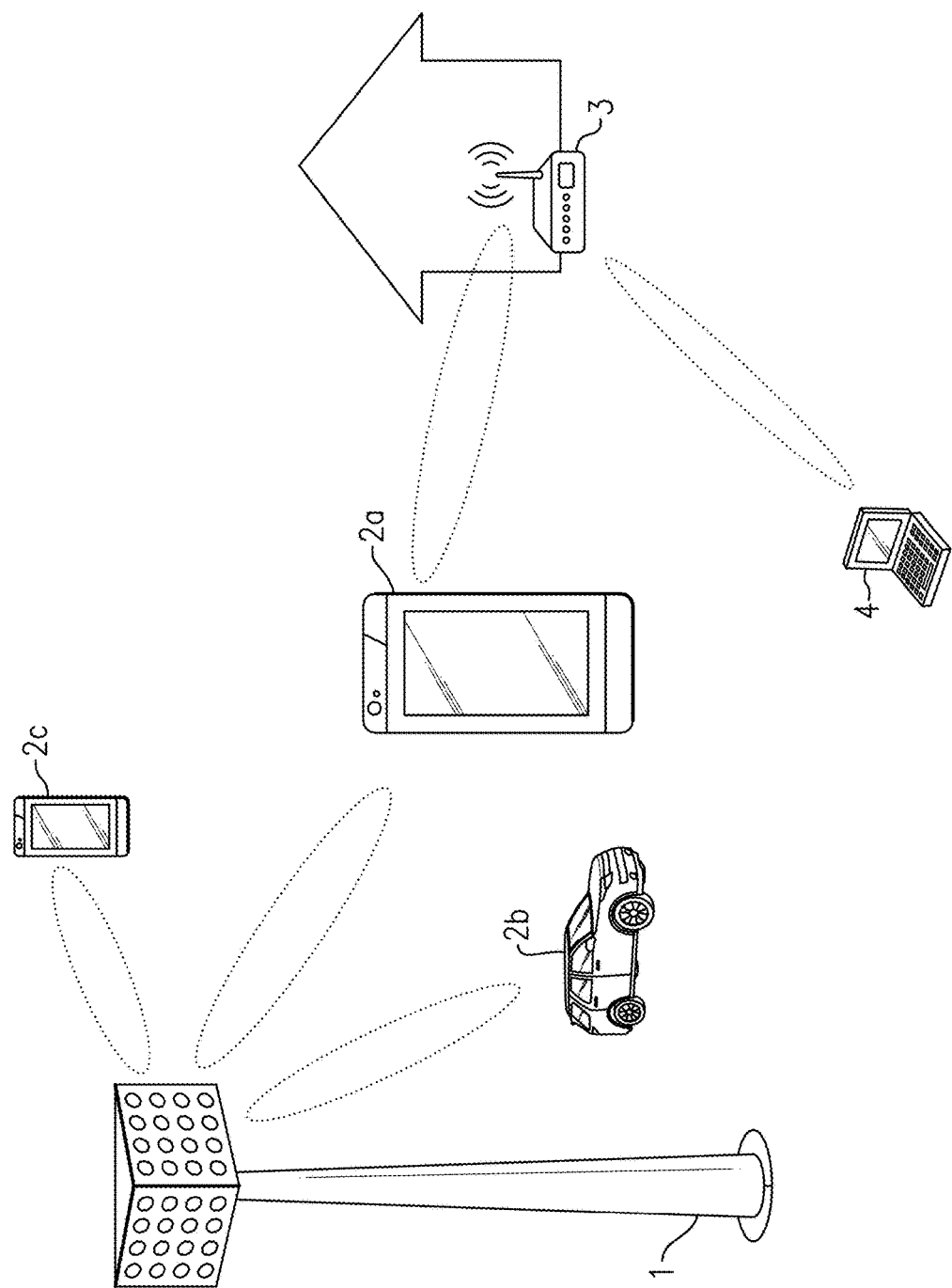
FIG. 1 is a schematic diagram of one example of a mobile device communicating via cellular and Wi-Fi networks.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a mobile device 2a communicating via cellular and Wi-Fi networks. For example, as shown in FIG. 1, the mobile device 2a communicates with a base station 1 of a cellular network and with a Wi-Fi access point 3 of a Wi-Fi network. FIG. 1 also depicts examples of other user equipment (UE) communicating with the base station 1, for instance, a wireless-connected car 2b and another mobile device 2c. Furthermore, FIG. 1 also depicts examples of other Wi-Fi-enabled devices communicating with the Wi-Fi access point 3, for instance, a laptop 4.

Although specific examples of cellular UE and Wi-Fi-enabled devices is shown, a wide variety of types of devices can communicate using cellular and/or Wi-Fi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, a mobile device, such as the mobile device 2a of FIG. 1, is implemented to support communications using a number of technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and Zig-Bee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

Although various examples of communication technologies have been described, mobile devices can be implemented to support a wide range of communications.

Various communication links have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Examples of RF Communication Systems with Interference Cancellation for Coexistence Radio frequency (RF) communication systems can include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a Wi-Fi network. For instance, the mobile device 2a of FIG. 1 is operable to communicate using cellular and Wi-Fi networks.

Although implementing the RF communication system in this manner can provide a number of benefits, a mutual desensitization effect can arise from cellular transmissions interfering with reception of Wi-Fi signals and/or from Wi-Fi transmissions interfering with reception of cellular signals. Furthermore, mutual desensitization effects can arise from other contexts aside from Wi-Fi and cellular.

In a first example, cellular Band 7 can give rise to mutual desensitization with respect to 2.4 Gigahertz (GHz) Wi-Fi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz Wi-Fi has TDD duplex and operates over a frequency range of about 2.40 GHz to about 2.50 GHz. Thus, cellular Band 7 and 2.4 GHz Wi-Fi are adjacent in frequency, and RF signal leakage due to high power transmissions of one transceiver/front end affects receiver performance of the other transceiver/front end, particularly at border frequency channels.

In a second example, cellular Band 40 and 2.4 GHz Wi-Fi can give rise to mutual desensitization. For instance, Band 40 has a TDD duplex and operates over a frequency range of about 2.30 GHz to about 2.40 GHz, while 2.4 GHz Wi-Fi has TDD duplex and operates over a frequency range of about 2.40 GHz to about 2.50 GHz. Accordingly, cellular Band 40 and 2.4 GHz Wi-Fi are adjacent in frequency and give rise to a number of coexistence issues, particularly at border frequency channels.

In a third example, cellular Band 41 and 2.4 GHz Wi-Fi suffer from difficulties in coexisting. Moreover, frequency separation between bands used for Wi-Fi and cellular Band 40, 41 and 7 is so small that use of filters alone is insufficient for signal separation when Wi-Fi and cellular communications are simultaneous. For example, sensitivity of a Wi-Fi receiver can be degraded by more than 40 dB in some cases due to the adjacent channel power level from the cellular transmitter.

In a fourth example, Band n79 (4400 MHz to 5000 MHz) is adjacent to the 5 GHz Wi-Fi band (5150 MHz to 5850 MHz). This coexistence case is particularly challenging, as acoustic filters or other filter technologies with similar performance at these frequency bands are relatively costly and/or of limited availability.

In a fifth example, a B8 sixth harmonic falls into 5 GHz Wi-Fi. Thus, concurrent use of cellular B8 and 5 GHz Wi-Fi can give rise to interference cancellation issues.

In a sixth example, a B71 third harmonic falls into B25 receive.

Interference is exacerbated by increasing symbol rate, since higher symbol rate also leads to an increase in the bandwidth of adjacent power from the aggressor transmitter. Furthermore, a number of other factors can increase interference or the risk of interference, including, but not limited to, closer antenna proximity, a greater degree of antenna sharing, an increase in the number of utilized frequency bands, a rise in the number of transceivers, inclusion of dual sim dual active (DSDA) features, dual uplink features, and/or support for multiple-input multiple-output (MIMO) or diversity communications.

Thus, concurrent radio access technologies (RATs) such as cellular, Wi-Fi, GPS, short range communications, millimeter wave, and/or Device-to-Device (D2D) have a need for management of out-of-band emissions to reduce interference and enhance performance in the presence of coexistence challenges between nearby bands.

Desensitization can arise in a variety of ways, such as direct leakage of an aggressor transmit signal to a victim receiver, spectral regrowth components generated in the transmitter, and/or other interference sources. Such interference can lie relatively closely in frequency with the victim receive signal and/or directly overlap it. Although a receive filter can provide some filtering of signal leakage, the receive filter may provide insufficient attenuation of the aggressor signal, and thus the sensitivity of the victim receiver is degraded.

In one example, desensitization arises where the transmit spectrum of a transmitter of a first transceiver is stronger than the desired signal inside the receive bandwidth of a receiver of a second transceiver.

Desensitization leads to limits for the isolation between antennas and thus isolation between the different transceivers of a wireless device. The problem is very serious, for instance, can lead to a degradation of the sensitivity of a Wi-Fi receiver by more than 40 dB in some cases due to the adjacent channel power level from a cellular transmitter.

Conventional techniques alone are insufficient for providing mutual coexistence. In one example, a very high quality-factor (high Q) bandpass filter (for instance, an acoustic bandpass filter) can be included at the output of a power amplifier of an aggressor transmitter to attenuate spectral regrowth. When the attenuation provided by the filter is sufficiently high, the victim receiver may not be significantly desensitized due to non-linearity of the aggressor transmitter. However, such high-Q bandpass filters can be prohibitively expensive and/or introduce insertion loss that degrades transmit performance.

In another example, a very high Q bandpass filter can be included on the victim receiver to attenuate high power leakage coupled in from the aggressor transmitter. When the attenuation is sufficiently high, the victim receiver is not significantly desensitized from coupling of the high power leakage into non-linear receive circuitry of the victim receiver. However, such high-Q bandpass filters can be prohibitively expensive and/or introduce insertion loss that degrades receiver sensitivity.

RF communication systems with interference cancellation for coexistence are provided herein. In certain embodiments, an RF communication system includes a transmitter that transmits a transmit signal through a first front end circuit, a receiver that processes a receive signal from a second front end circuit, and a feedback receiver that processes a feedback signal from the first front end circuit to generate a digital interference cancellation signal that compensates the receiver for interference arising from the transmitter.

By implementing the RF communication system in this manner, dynamic range and/or noise figure is improved, thereby enabling cancellation of aggressor signals close to the receiver's noise floor.

In certain implementations, the feedback signal includes frequency content indicating aggressor interference with the victim receiver filter, while having frequency content of the aggressor carrier filtered or removed. For example, the first front end circuit can include a passive analog filter that generates the feedback signal based on sensing the interference at the transmitter (aggressor) output, for instance, adjacent channel leakage ratio (ACLR), harmonics, and/or intermodulation distortion (IMD). Implementing the RF communication system in this manner suppresses transmit carrier, which reduces the linearity specifications of the feedback receiver.

Such interference cancellation schemes are also applicable to carrier aggregation scenarios, for instance, transmit harmonics fallings into aggregated received bands in multi-RAT systems.

In certain implementations, the feedback receiver operates to down-convert the feedback signal from radio frequency to baseband, digitize the down-converted signal using an analog-to-digital converter, and process the digitized feedback signal to calculate the digital interference cancellation signal. Additionally, the main receiver processes the digital interference cancellation signal to cancel interference.

For example, the main receiver can operate to subtract the digital interference cancellation signal from a main digital receive signal received by way of the second front end circuit, thereby reducing desensitization arising from the aggressor RF spectrum. Utilizing digital processing in this manner can aid in relaxing design constraints of costly analog components and/or the enable use of cheaper RF front end filters.

Moreover, the feedback signal can account for non-linear effects of the power amplifier of the first front end circuit, and thus the digital processing can accurately account for the interference without needing to estimate or model the non-linear effects of the power amplifier.

Furthermore, the feedback signal is processed using a feedback receiver/feedback path that can have similar non-idealities as a main receiver/receive path used to process main receive signals. For example, in certain implementations, the feedback pack is implemented to replicate or otherwise track (for instance, in terms of frequency response and/or time response) a receive path subject to interference. Thus, the cancellation model is simplified, which in turn can result in digital self-interference cancellation implemented with high accuracy, low complexity (for instance, a digital model for ACLR cancellation with one coefficient or a small number of coefficients), small area, and/or low current consumption.

Such tracking also provides stability versus a variety of parameters, such as temperature and/or voltage standing wave ratio (VSWR). This in turn allows infrequent calculation of the coefficients of the cancellation model and avoids a need for dedicated hardware accelerators for coefficient calculation.

In certain implementations, the transmitter/first front end circuit can process RF signals of a different type than the receiver/second front end circuit. In one example, the transmitter/first front end circuit processes cellular signals while the receiver/second front end circuit processes WLAN signals (for instance, Wi-Fi signals), or vice versa. In certain implementations, the transmitter is included in a cellular transceiver, and the receiver is included in a Wi-Fi transceiver. Thus, in certain implementations herein, coexistence is provided between cellular and Wi-Fi radios.

However, the teachings herein are applicable to a wide range of RF communication systems, including, but not limited to systems communicating using 4G, 5G NR, WLAN, WPAN, WMAN, and/or GPS signaling. Furthermore, such RF communication systems can operate with a number of features, including, but not limited to, DSDA, MIMO, carrier aggregation, and/or diversity.

Figure 2A:
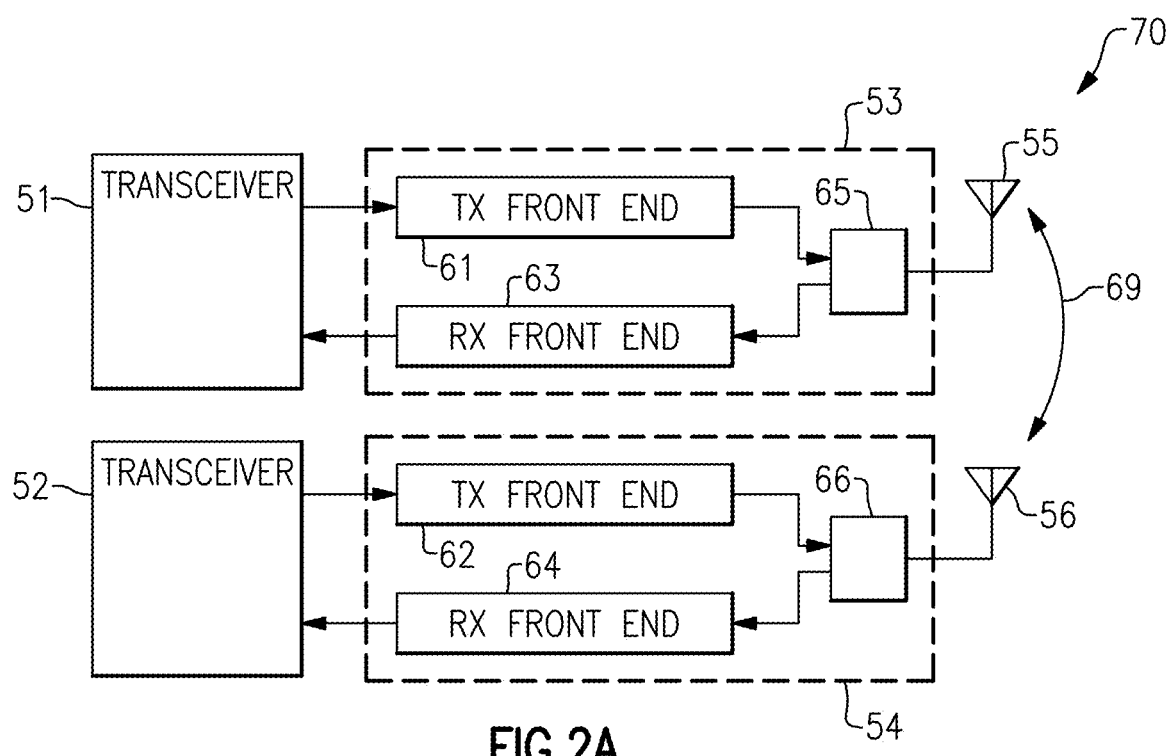
FIG. 2A is a schematic diagram of one example of signal leakage for an RF communication system.

FIG. 2A is a schematic diagram of one example of signal leakage for an RF communication system 70. As shown in FIG. 2A, the RF communication system 70 includes a first transceiver 51, a second transceiver 52, a first front end system 53, a second front end system 54, a first antenna 55, and a second antenna 56.

Including multiple transceivers, front end systems, and antennas enhances the flexibility of the RF communication system 70. For instance, implementing the RF communication system 70 in this manner can allow the RF communication system 70 to communicate using different types of networks, for instance, cellular and Wi-Fi networks.

In the illustrated embodiment, the first front end system 53 includes a transmit front end circuit 61, a receive front end circuit 63, and an antenna access circuit 65, which can include one or more switches, duplexers, diplexers, and/or other circuitry for controlling access of the transmit front end circuit 61 and the receive front end circuit 63 to the first antenna 55. The second front end system 54 includes a transmit front end circuit 62, a receive front end circuit 64, and an antenna access circuit 66.

Although one example implementation of front end systems is shown in FIG. 2A, the teachings herein are applicable to front end systems implemented in a wide variety of ways. Accordingly, other implementations of front end systems are possible.

RF signal leakage 69 between the first antenna 55 and the second antenna 56 can give rise to a number of coexistence issues. The interference cancellation schemes herein provide compensation to reduce or eliminate the impacts of such RF signal leakage. Moreover, interference cancellation can also be provided in implementations using a shared antenna.

Figure 2B:
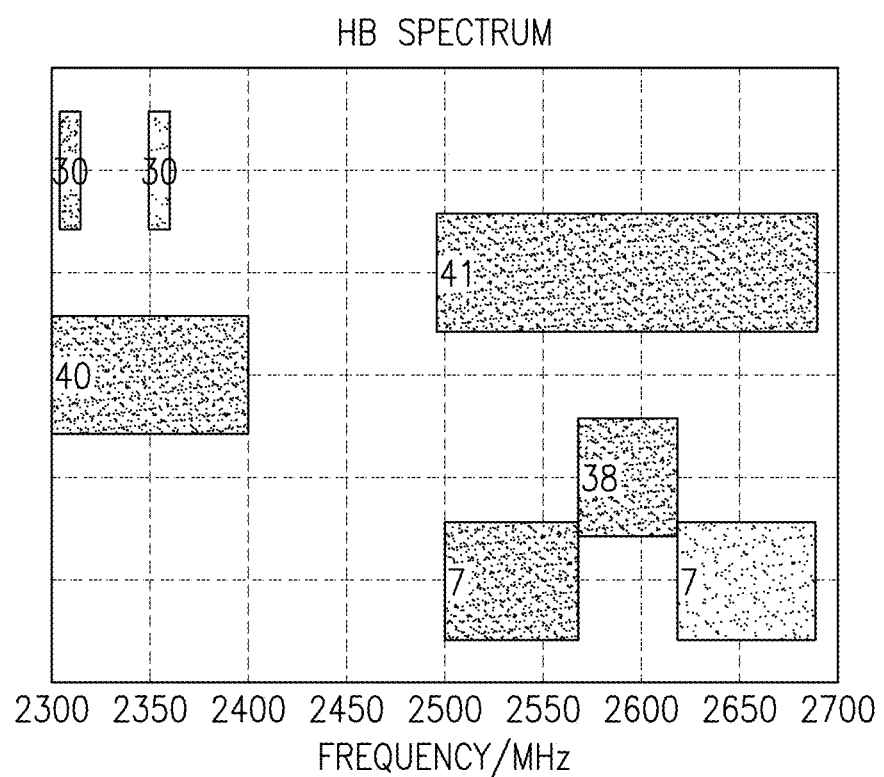
FIG. 2B is a graph depicting the location in frequency of various bands for wireless communication.

FIG. 2B is a graph depicting the location in frequency of various bands for wireless communication.

In the example shown, various frequency ranges used in Band 7, Band 30, Band 38, Band 40, and Band 41 communications are depicted. The graph depicts the congestion of frequency bands over this frequency range. Such congestion gives rise to coexistence issues near the 2.4 GHz ISM band.

Figure 2C:
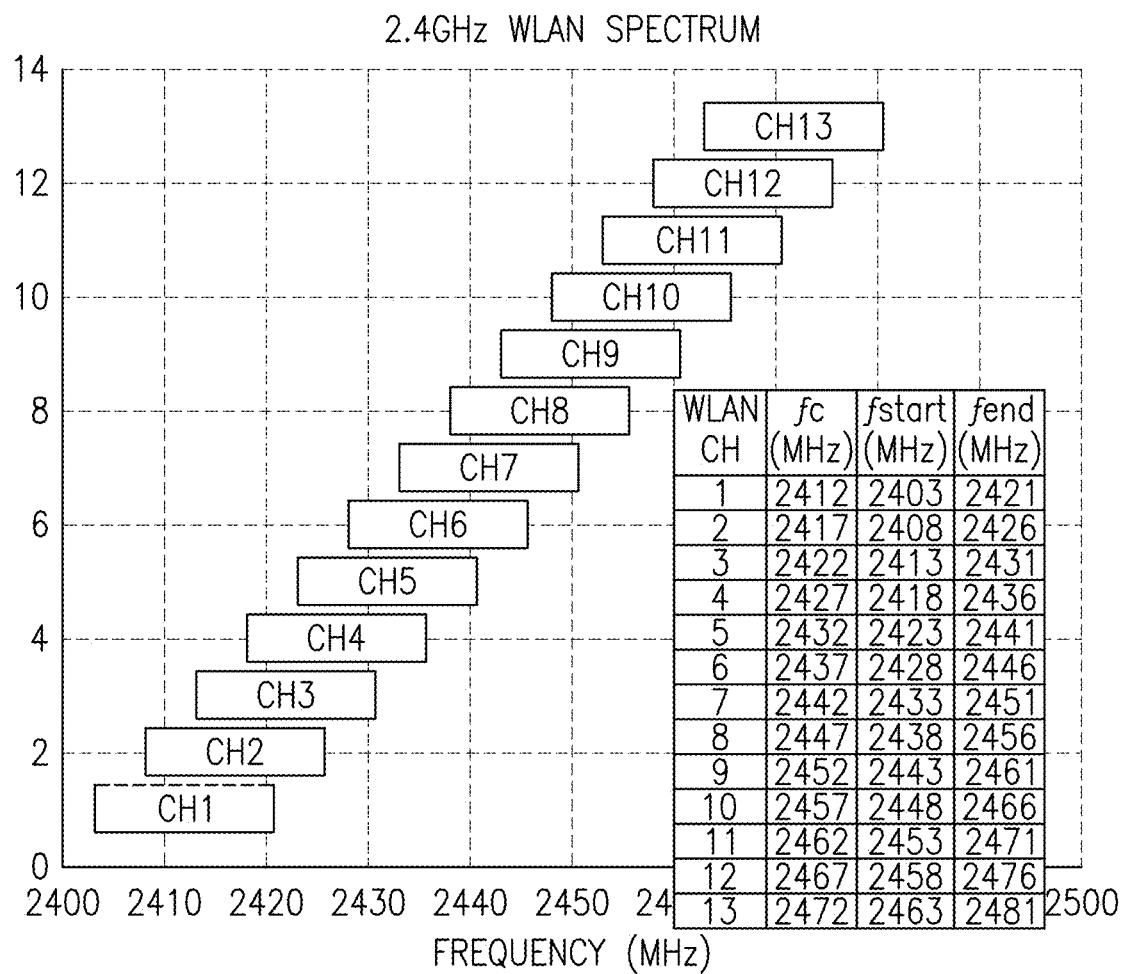
FIG. 2C is a graph of frequency versus wireless local area network (WLAN) channel.

FIG. 2C is a graph of frequency versus wireless local area network (WLAN) channel.

With reference to FIGS. 2B and 2C, a number of 2.4 GHz WLAN channels give rise to coexistence issues with cellular banks. In a first example, cellular Band 7 can give rise to desensitization with respect to 2.4 GHz Wi-Fi. In a second example, cellular Band 40 can give rise to desensitization with respect to 2.4 GHz Wi-Fi. In a third example, cellular Band 41 can give rise to desensitization with respect to 2.4 GHz Wi-Fi.

Although examples of desensitization between cellular and 2.4 GHz Wi-Fi are provided, other types of communications can suffer from coexistence issues. For instance, Band n79 can give rise to desensitization with respect to 5 GHz Wi-Fi. Furthermore, coexistence issues can arise outside the context of cellular and Wi-Fi. For instance, a wide variety of RATs such as cellular, Wi-Fi, GPS, short range communications, millimeter wave, and/or D2D can suffer from coexistence challenges between nearby bands.

Figure 3:
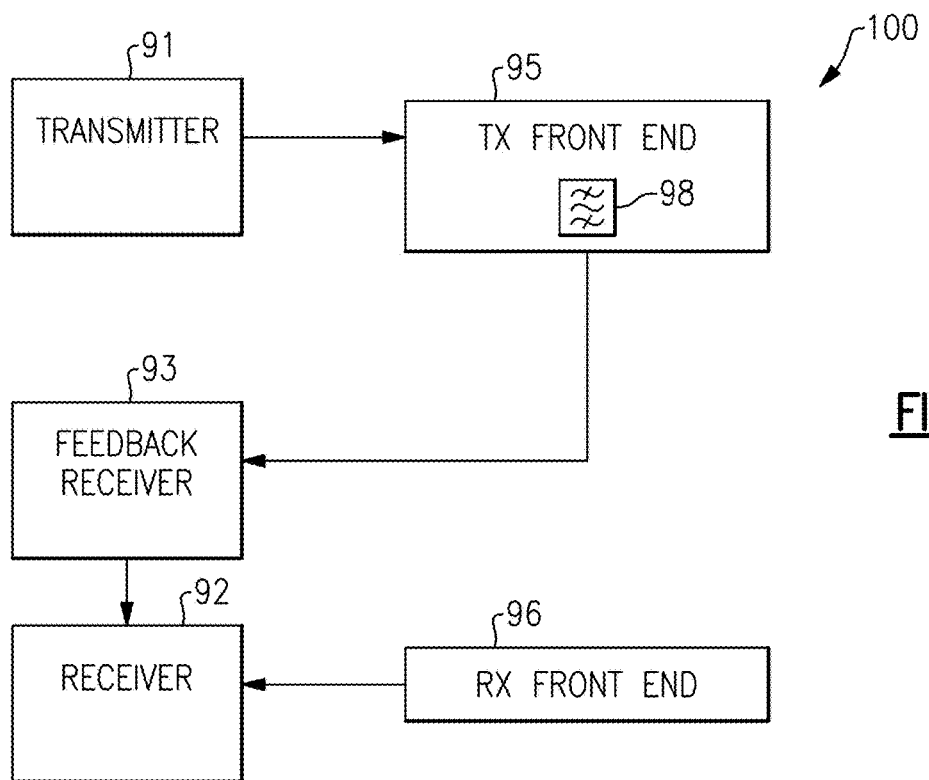
FIG. 3 is a schematic diagram of an RF communication system with interference cancellation according to one embodiment.

FIG. 3 is a schematic diagram of an RF communication system 100 with interference cancellation according to one embodiment. The RF communication system 100 includes a transmitter 91, a receiver 92 (also referred to herein as a main receiver), a feedback receiver 93, a transmit front end circuit 95, and a receive front end circuit 96.

The transmitter 91 operates to transmit a transmit signal through the transmit front end circuit 95. Additionally, the receiver 92 processes a receive signal from the receive front end circuit 96.

As shown in FIG. 3, the transmit front end circuit 95 includes a filter 98 (for instance, a passive analog filter) for generating a feedback signal for the feedback receiver 93. The feedback receiver 93 processes the feedback signal to generate a digital interference cancellation signal. Additionally, the receiver 92 receives the digital interference cancellation signal and uses the digital interference cancellation signal to compensate the receiver 92 for interference arising from the transmitter 91.

The filter 98 serves to filter the transmit signal to inject a desired portion of the frequency spectrum of the transmit signal into the feedback receiver 93. In certain implementations, the feedback signal includes frequency content indicating aggressor interference with the victim receiver filter, while having frequency content of the aggressor carrier filtered or removed.

Accordingly, the filter 98 can output the feedback signal to include ACLR, second harmonic (H2), third harmonic (H3), IMD, and/or other frequency content indicating interference. Implementing the RF communication system 100 in this manner suppresses transmit carrier, which reduces linearity specifications of the feedback receiver 93.

In certain implementations, the feedback receiver 93 operates to down-convert the feedback signal from radio frequency to baseband, digitize the down-converted signal using an analog-to-digital converter, and process the digitized feedback signal to calculate the digital interference cancellation signal. Additionally, the main receiver 92 processes the digital interference cancellation signal to compensate a main digital receive signal for interference.

In certain implementations, the transmitter 91 and the transmit front end circuit 95 can process RF signals of a different type than the receiver 92 and the receive front end circuit 96. In one example, the transmitter 91 and the first front end circuit 95 process cellular signals while the receiver 92 and the receive front end circuit 96 processes WLAN signals, or vice versa. In certain implementations, the transmitter 91 is included in one of a cellular transceiver or a WLAN transceiver, and the receiver 92 is included in the other of the cellular transceiver and the WLAN transceiver. Thus, in certain implementations herein, coexistence is provided between cellular and WLAN radios.

However, the teachings herein are applicable to a wide range of RF communication systems, including, but not limited to systems communicating using 4G, 5G NR, WLAN, WPAN, WMAN, and/or GPS signaling.

In certain implementations, the transmit front end circuit 95 and the receive front end circuit 96 communicate using separate antennas. In other implementations, the transmit front end circuit 95 and the receive front end circuit 96 communicate using a shared antenna.

Figure 4:
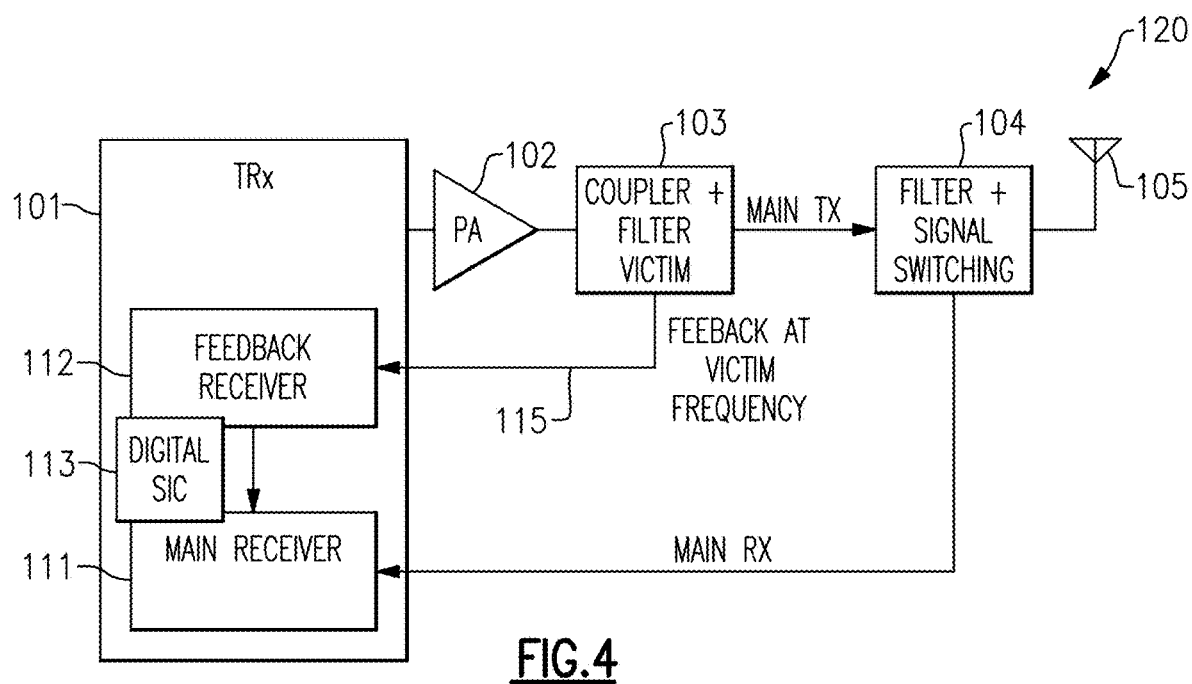
FIG. 4 is a schematic diagram of an RF communication system with interference cancellation according to another embodiment.

FIG. 4 is a schematic diagram of an RF communication system 120 with interference cancellation according to another embodiment. The RF communication system 120 includes transceiver circuitry 101, a power amplifier 102, a coupler/filter circuit 103, a filter/signal switching circuit 104, and an antenna 105.

Although one embodiment of an RF communication system with interference cancellation is shown, the teachings herein are applicable to RF communications systems implemented in a wide variety of ways. Accordingly, other implementations are possible.

The transceiver circuitry 101 includes a main receiver 111, a feedback receiver 112, and a digital self-interference cancellation (SIC) circuit 113. Additionally, the transceiver circuitry 101 includes a transmitter that outputs an RF transmit signal for amplification by the power amplifier 102. Thus, the transceiver circuitry 101 is integrated, in this example. For instance, the transceiver circuitry 101 can be integrated on a common semiconductor chip or die on which two or more transceivers (for instance, for different communications standards) are included. However, other implementations are possible, such as configurations using separate transceiver dies.

Although the digital SIC circuit 113 is shown as separate from the feedback receiver 112 and the main receiver 111, the digital SIC circuit 113 can be integrated in all or part into the feedback receiver 112 and/or the main receiver 111. For example, the digital SIC circuit 113 can correspond to a digital processing circuit (for instance, digital logic) that processes an output of an ADC of the feedback receiver 112 to generate a digital interference cancellation signal. Thus, the digital SIC circuit 113 can implement a digital model for interference cancellation.

In the illustrated embodiment, a main RF transmit signal from the power amplifier 102 is provided to the antenna 105 by way of the coupler/filter circuit 103. Additionally, the coupler/filter circuit 103 operates to couple a portion of the main RF transmit signal, and filter the coupled signal to generate a feedback signal 115. The coupler/filter circuit 103 is implemented to generate the feedback signal 115 to include information indicating feedback at the victim frequency range or ranges.

With continuing reference to FIG. 4, the main receiver 111 receive a main RF receive signal by way of the filter/signal switching circuit 104. In this embodiment, the main RF transmit signal and the main RF receive signal are wirelessly communicated by way of a shared antenna. However, in other implementations, separate antennas are used.

As shown in FIG. 4, the feedback receiver 112 processes the feedback signal 115. For example, the feedback signal 115 can be downconverted to baseband, filtered, and digitized to generate a digital feedback signal. Additionally, the digital feedback signal is digitally processed by the digital SIC circuit 113 to generate the digital interference cancellation signal.

Figure 5A:
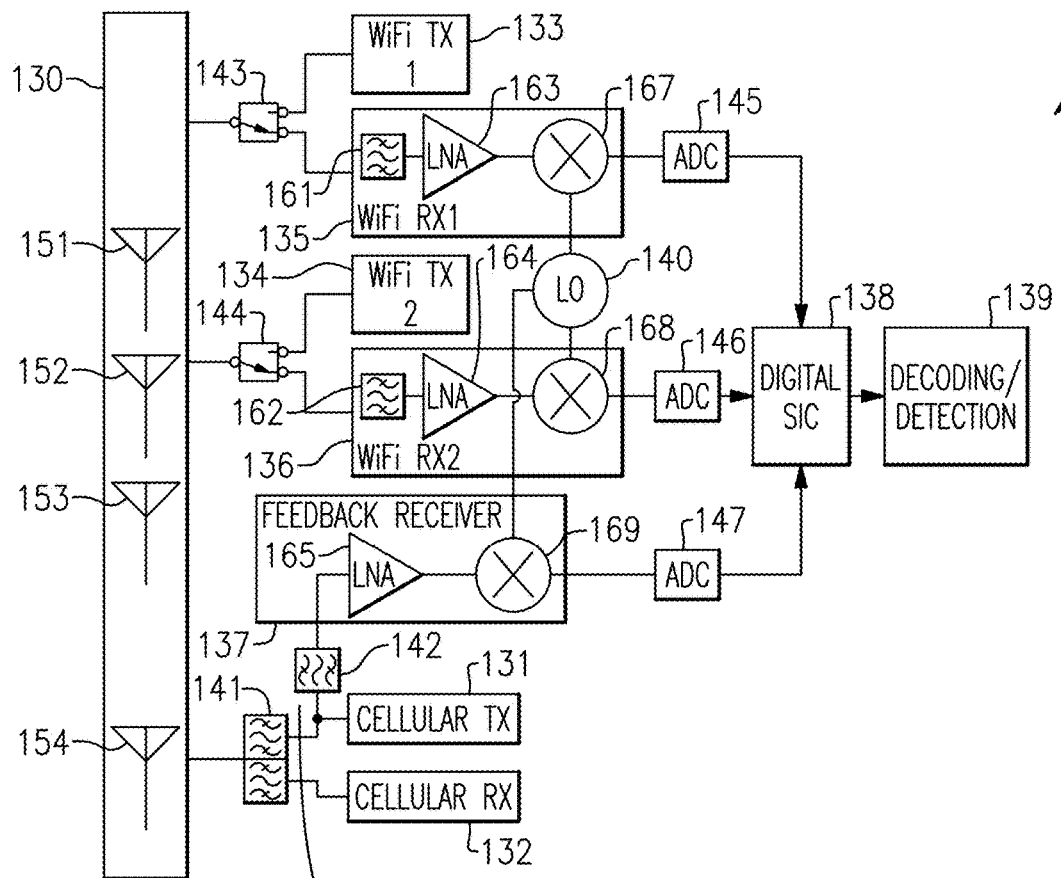
FIG. 5A is a schematic diagram of an RF communication system with interference cancellation according to another embodiment.

FIG. 5A is a schematic diagram of an RF communication system 200 with interference cancellation according to another embodiment. The RF communication system 200 includes an antenna array 130, a cellular transmitter 131, a cellular receiver 132, a first Wi-Fi transmitter 133, a second Wi-Fi transmitter 134, a first Wi-Fi receiver 135, a second Wi-Fi receiver 136, a feedback receiver 137, a digital SIC circuit 138, a decoding/detection circuit 139, a local oscillator (LO) 140, a duplexer 141, a bandpass filter 142, a first Wi-Fi transmit/receive (T/R) switch 143, a second Wi-Fi T/R switch 144, a first Wi-Fi receive analog-to-digital converter (ADC) 145, a second Wi-Fi receive ADC 146, and a feedback ADC 147. The antenna array 130 includes first to fourth antennas 151-154, respectively, in this example.

In the illustrated embodiment, the first Wi-Fi receiver 135 includes a receive filter 161, a low noise amplifier (LNA) 163, and a downconverting mixer 167. Additionally, the second Wi-Fi receiver 136 includes a receive filter 162, an LNA 164, and a downconverting mixer 168. Furthermore, the feedback receiver 137 includes an LNA 165 and a downconverting mixer 169.

Although another embodiment of an RF communication system with interference cancellation is shown, the teachings herein are applicable to RF communications systems implemented in a wide variety of ways.

The bandpass filter 142 serves to provide filtering to obtain a feedback signal corresponding to a portion of the cellular transmit signal desired for cancellation. In one example, the bandpass filter 142 passes spectral regrowth in the Wi-Fi receive band while blocking a carrier frequency of the cellular transmit signal from the cellular transmitter 131.

As shown in FIG. 5A, the feedback receiver 137 amplifies and downconverts the feedback signal, in this example. Additionally, the feedback ADC 147 digitizes the downconverted signal to generate a digital feedback signal. The downconverters 167-169 operate using a common LO frequency, in this embodiment.

The digital SIC circuit 138 processes the digital feedback signal to generate one or more digital interference cancellation signals suitable for digitally compensating a first digital Wi-Fi receive signal from the first Wi-Fi receive ADC 145 and a second digital Wi-Fi receive signal from the second Wi-Fi receive ADC 146. Thus, the digital SIC circuit 138 compensates two Wi-Fi receive signals in this example. In certain embodiments herein, multiple receive signals, such as those associated with downlink MIMO, are compensated based on one or more digital interference cancellation signals. In certain implementations, a common digital interference cancellation signal is used for compensation. In other implementations, separate digital interference cancellation signals are used for compensation.

Providing digital interference cancellation in this manner increases dynamic range and/or noise figure, thereby enabling cancellation of aggressor signals close to the noise floor of the Wi-Fi receivers 135-136 and/or reducing desensitization arising from the aggressor RF spectrum. Furthermore, utilizing digital interference cancellation aids in relaxing design constraints of costly analog components and/or the enable use of cheaper RF front end filters. Moreover, the feedback signal can account for non-linear effects of the cellular transmitter 131, and thus the digital processing can accurately account for the interference without needing to estimate or model the non-linear effects of the cellular transmitter 131.

In certain implementations, the digital SIC circuit 138 is implemented with controllable delay circuitry for controlling a relative delay between the digital feedback signal and the receive signal(s) being compensated. For example, a delay through the feedback receiver 137 can be different due to signal route delays (for instance, PCB traces and/or cables) and/or delays through the filter 142 (which can be, for instance, a bulk acoustic wave or BAW filter with relatively high delay) or other front end components. By implementing the digital SIC circuit 138 with controllable delay circuitry, self-interference cancellation with higher performance can be realized.

Figure 5B:
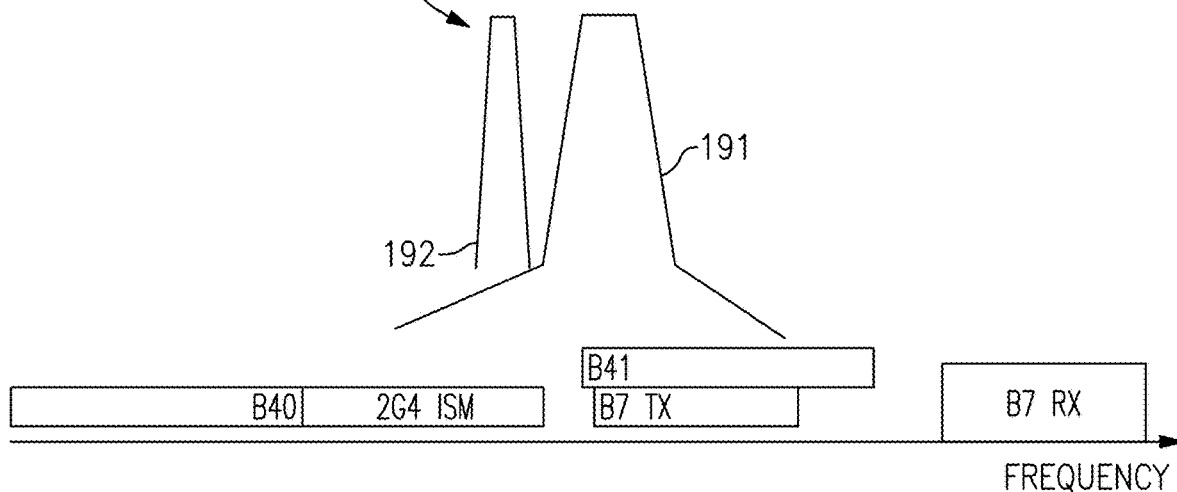
FIG. 5B depicts one example of a graph of magnitude versus frequency for the RF communication system of FIG. 5A.

FIG. 5B depicts one example of a graph of magnitude versus frequency for the RF communication system of FIG. 5A. In this example, a transmit spectrum 191 of the cellular transmitter 131 is shown along with a filtering characteristic 192 of the bandpass filter 142.

In certain implementations, a feedback signal for interference cancellation includes frequency content indicating aggressor interference with the victim receiver filter, while having frequency content of the aggressor carrier filtered or removed. For example, the bandpass filter 142 can generate the feedback signal based on sensing the interference at the output of the cellular transmitter 131, for instance, ACLR, H2, H3, IMD, and/or other interference desired to be cancelled. Implementing the RF communication system 200 in this manner suppresses transmit carrier, which reduces the linearity specifications of the feedback receiver 137.

Figure 6A:
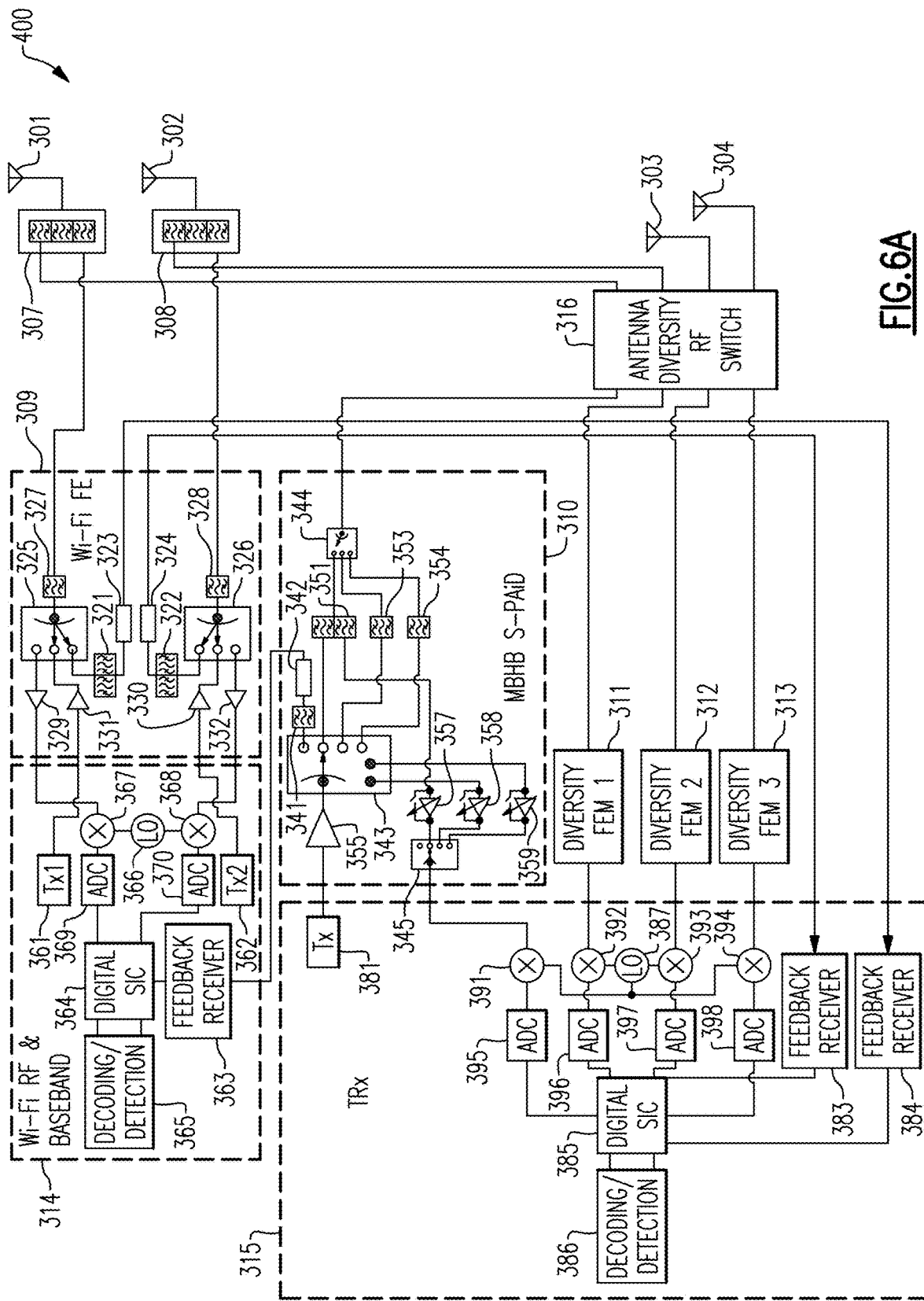
FIG. 6A is a schematic diagram of an RF communication system with interference cancellation according to another embodiment.

FIG. 6A is a schematic diagram of an RF communication system 400 with interference cancellation according to another embodiment. The RF communication system 400 includes a first antenna 301, a second antenna 302, a third antenna 303, a fourth antenna 304, a first antenna multiplexer 307, a second antenna multiplexer 308, a Wi-Fi front end 309, a cellular front end 310, a first diversity front end 311, a second diversity front end 312, a third diversity front end 313, a Wi-Fi transceiver 314, a cellular transceiver 315, and an antenna diversity switch 316.

Although another embodiment of an RF communication system with interference cancellation is shown, the teachings herein are applicable to RF communications systems implemented in a wide variety of ways.

In the illustrated embodiment, the Wi-Fi front end 309 includes a first feedback diplexer 321, a first feedback attenuator 323, a second feedback diplexer 322, a second feedback attenuator 324, a first Wi-Fi multi-throw switch 325, a second Wi-Fi multi-throw switch 326, a first Wi-Fi filter 327, a second Wi-Fi filter 328, a first Wi-Fi LNA 329, a second Wi-Fi LNA 332, a first Wi-Fi power amplifier 331, and a second Wi-Fi power amplifier 330.

With continuing reference to FIG. 6A, the cellular front end 310 includes a feedback filter 341, a feedback attenuator 342, a first cellular multi-throw switch 343, a second cellular multi-throw switch 344, a third cellular multi-throw switch 345, a cellular duplexer 351, a first cellular transmit filter 353, a second cellular transmit filter 354, a cellular power amplifier 355, a first cellular LNA 357 (with bypass and controllable gain, in this example), a second cellular LNA 358, and a third cellular LNA 359.

The Wi-Fi transceiver 314 includes a first Wi-Fi transmitter 361, a second Wi-Fi transmitter 362, a Wi-Fi feedback receiver 363, a digital Wi-Fi SIC circuit 364, a decoding/detection circuit 365, an LO 366, a first downconverting mixer 367, a second downconverting mixer 368, a first Wi-Fi receive ADC 369, and a second Wi-Fi receive ADC 370.

In the illustrated embodiment, the cellular transceiver 315 includes a cellular transmitter 381, a first cellular feedback receiver 383, a second cellular feedback receiver 384, a digital cellular SIC circuit 385, a cellular decoding/detection circuit 386, an LO 387, a first downconverting mixer 391, a second downconverting mixer 392, a third downconverting mixer 393, a fourth downconverting mixer 394, a first receive ADC 395, a second receive ADC 396, a third receive ADC 397, and a fourth receive ADC 398.

The RF communication system 400 of FIG. 6A supports processing of four downlink MIMO signals (4×MIMO) for cellular and two downlink MIMO signals (2×MIMO) for Wi-Fi.

In this example, four antennas 301-304 are included, with two of the antennas (the first antenna 301 and the second antenna 302) shared for Wi-Fi and cellular and two other antennas (the third antenna 303 and the fourth antenna 304) dedicated to cellular.

In FIG. 6A, the RF switches are depicted as being set for a use case in which ACLR of the Wi-Fi transmitters serve as aggressors towards the cellular receivers. All four of the cellular receivers are potentially degraded by the ACLR of the Wi-Fi transmitters. Moreover, a coupling path between the antennas can change as the coupling is impacted by proximity and/or blockage of a person and/or objects near the antennas.

The RF communication system 400 is implemented with capability for full support of MIMO and diversity (for instance, best antenna selection or BAS switch diversity) for both cellular and WiFi. Moreover, interference cancellation is provided for both Wi-Fi transmission interfering with cellular reception and for cellular transmission interfering with W-Fi reception.

With continuing reference to FIG. 6A, the first Wi-Fi multi-throw switch 325 and the second Wi-Fi multi-throw switch 326 each include not only throws for connecting to Wi-Fi transmit and receive paths, but also an additional throw for connecting to a feedback path for interference cancellation.

By providing flexibility to selectively connect or disconnect a feedback path using an RF switch, a number of advantages can be realized. For example, for use cases where improvement to co-existence is not desired, the additional insertion loss due to the additional throw in the RF switch is low. Thus, loading loss of the filtering and feedback path is not suffered by the main transmit path when interference cancellation is disabled. For instance, in one example, loading loss is less than 0.05 dB for an implementation using SOI switches.

Thus, feedback for interference cancellation can be selectively provided to the first cellular feedback receiver 383 and/or the second cellular feedback receiver 384. After processing by the cellular feedback receiver(s), the cellular digital SIC circuit 385 processes the digital feedback signal(s) to provide digital interference cancellation to one or more of the digital cellular receive signals outputted by the ADCs 395-398 of the cellular transceiver 315.

In the illustrated embodiment, the feedback signals from the Wi-Fi front end 309 are generated using diplexers. By generating a feedback signal using a diplexer or higher order frequency multiplexer (for instance, a triplexer or a quadplexer), multiple frequency ranges can be sensed for interference cancellation.

In one example, the first feedback diplexer 321 and the second feedback diplexer 322 are implemented as modified versions of B40/B41 filters in which bandwidth is narrower to sense desired victim frequencies. For instance, a portion of the spectrum just adjacent to the Wi-Fi band can be filtered out, and the diplexers can operate with a frequency separation of about 120 MHz. In certain implementations, the diplexers have higher insertion loss to lower component cost.

In the illustrated embodiment, the first feedback diplexer 321 and the second feedback diplexer 322 are integrated into the Wi-Fi front end 309 (for instance, on a common front end module), thereby providing co-integration and co-design of the aggressor feedback path filters with the main transmit path. Integrating the diplexers or other feedback filters in this manner can enhance performance by providing tight control of loading loss, which is a function of impedances and relative phase shift that can be dependent on module design and package layout.

As shown in FIG. 6A, the first feedback attenuator 323 and the second feedback attenuator 324 have been included. Including the attenuators can provide a number of advantages, such as compensation for poor impedance matching when the feedback paths travel over long signal routes (for instance, over cross-UE cables and/or long printed circuit board traces) to reach the feedback receivers of the cellular transceiver 315.

With continuing reference to FIG. 6A, the first cellular multi-throw switch 343 includes a throw for connected to a feedback path for interference cancellation, implemented using the feedback filter 341 and the feedback attenuator 342, in this embodiment. The feedback filter 341 can be implemented in a wide variety of ways. In a first example, the feedback filter 341 is implemented as a bandpass filter that is similar to a Wi-Fi bandpass filter but with narrower bandwidth to avoid loading the B40/B41/B7 filter when interference cancellation is active. In a second example, the feedback filter 341 is implemented as a filter bank to facilitate different channel and band combinations for both transceivers (Wi-Fi and cellular, in this embodiment).

When selected, the feedback path provides a feedback signal to the Wi-Fi feedback receiver 363. Additionally, the Wi-Fi feedback receiver 363 and the Wi-Fi digital SIC circuit 364 collectively operate to process the feedback signal to provide digital interference cancellation to the digital WiFi receive signals outputted by the first Wi-Fi receive ADC 369 and the second Wi-Fi receive ADC 370.

In certain implementations, one or more of the feedback receivers (for instance, the Wi-Fi feedback receiver 363, the first cellular feedback receiver 383, and/or the second cellular feedback receiver 384) are used not only for processing a feedback signal for interference cancellation, but also for closed loop power control and/or antenna tuning. For example, closed loop power control and/or antenna tuning can be used intermittently to conserve power. In such implementations, one or more of RF switches can be further included and/or one or more additional throws can be added to thereby share feedback receivers for interference cancellation with closed loop power control and/or antenna tuning. Although feedback receivers can be shared in certain implementations, in other implementations dedicated aggressor feedback path electronics are used.

In certain implementations, one or more digital SIC circuits (for instance, the digital Wi-Fi SIC circuit 364 and/or the digital cellular SIC circuit 385 not only provide processing for interference cancellation, but also are used for processing of harmonic suppression and/or cancellation of transmit noise in receive band for cellular FDD systems. In other implementations, dedicated circuitry is used to implement the digital SIC circuits.

Figure 6B:
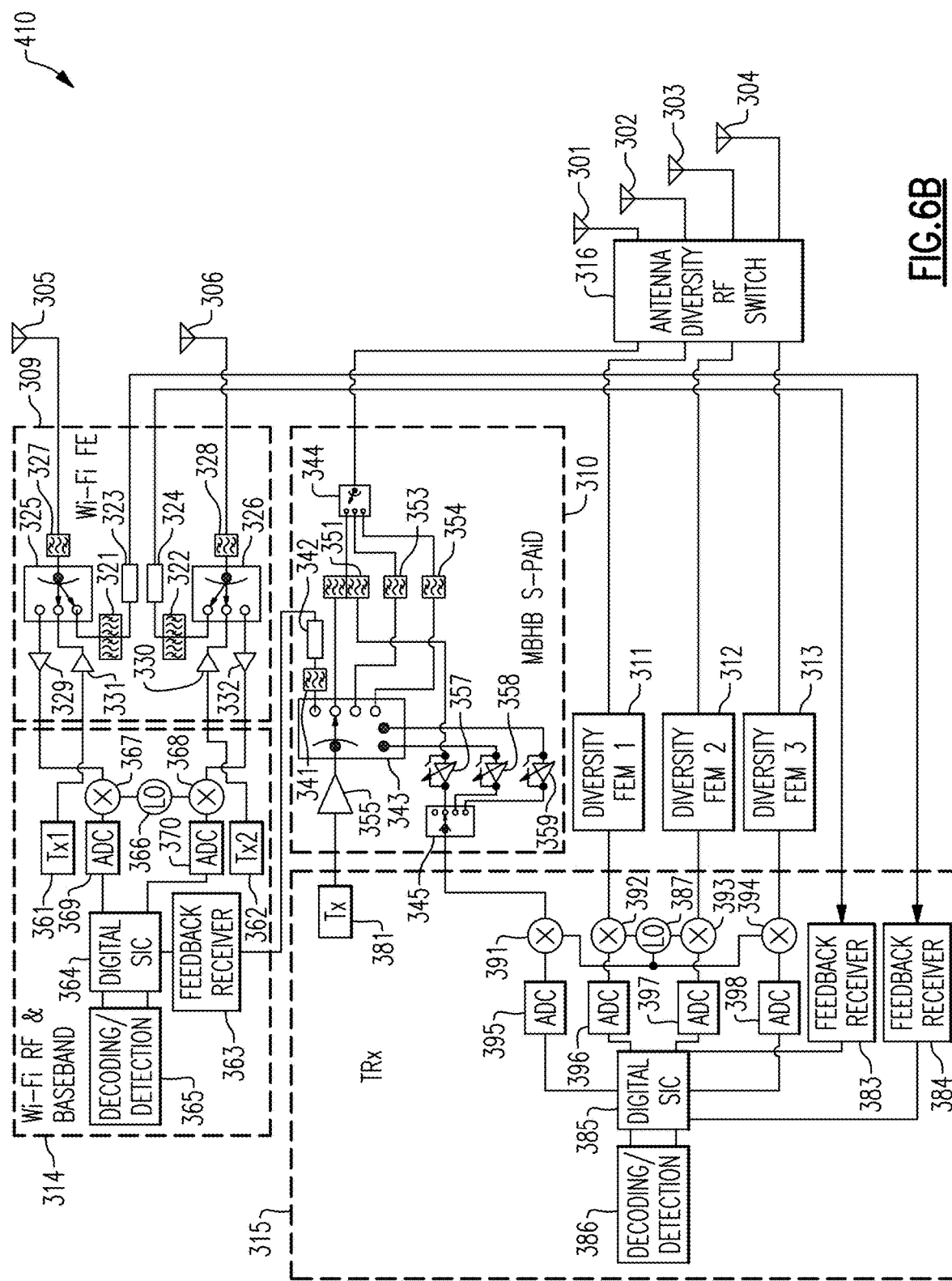
FIG. 6B is a schematic diagram of an RF communication system with interference cancellation according to another embodiment.

FIG. 6B is a schematic diagram of an RF communication system 410 with interference cancellation according to another embodiment. The RF communication system 410 includes a first antenna 301, a second antenna 302, a third antenna 303, a fourth antenna 304, a fifth antenna 305, a sixth antenna 306, a Wi-Fi front end 309, a cellular front end 310, a first diversity front end 311, a second diversity front end 312, a third diversity front end 313, a Wi-Fi transceiver 314, a cellular transceiver 315, and an antenna diversity switch 316.

Although another embodiment of an RF communication system with interference cancellation is shown, the teachings herein are applicable to RF communications systems implemented in a wide variety of ways.

The RF communication system 410 of FIG. 6B is similar to the RF communication system 400 of FIG. 6A, except that the RF communication system 410 omits the first antenna multiplexer 307 and the second antenna multiplexer 308 of FIG. 6A in favor of including the fifth antenna 305 and the sixth antenna 306.

Accordingly, six separate antennas are provided with two antennas supporting Wi-Fi (for instance, 2×MIMO/diversity) and four antennas supporting cellular (for instance, 4×MIMO/diversity).

Although FIGS. 6A and 6B illustrated various antenna and antenna multiplexer configurations, the teachings herein are applicable to RF communications system implemented in a wide variety of ways.

Figure 7A:
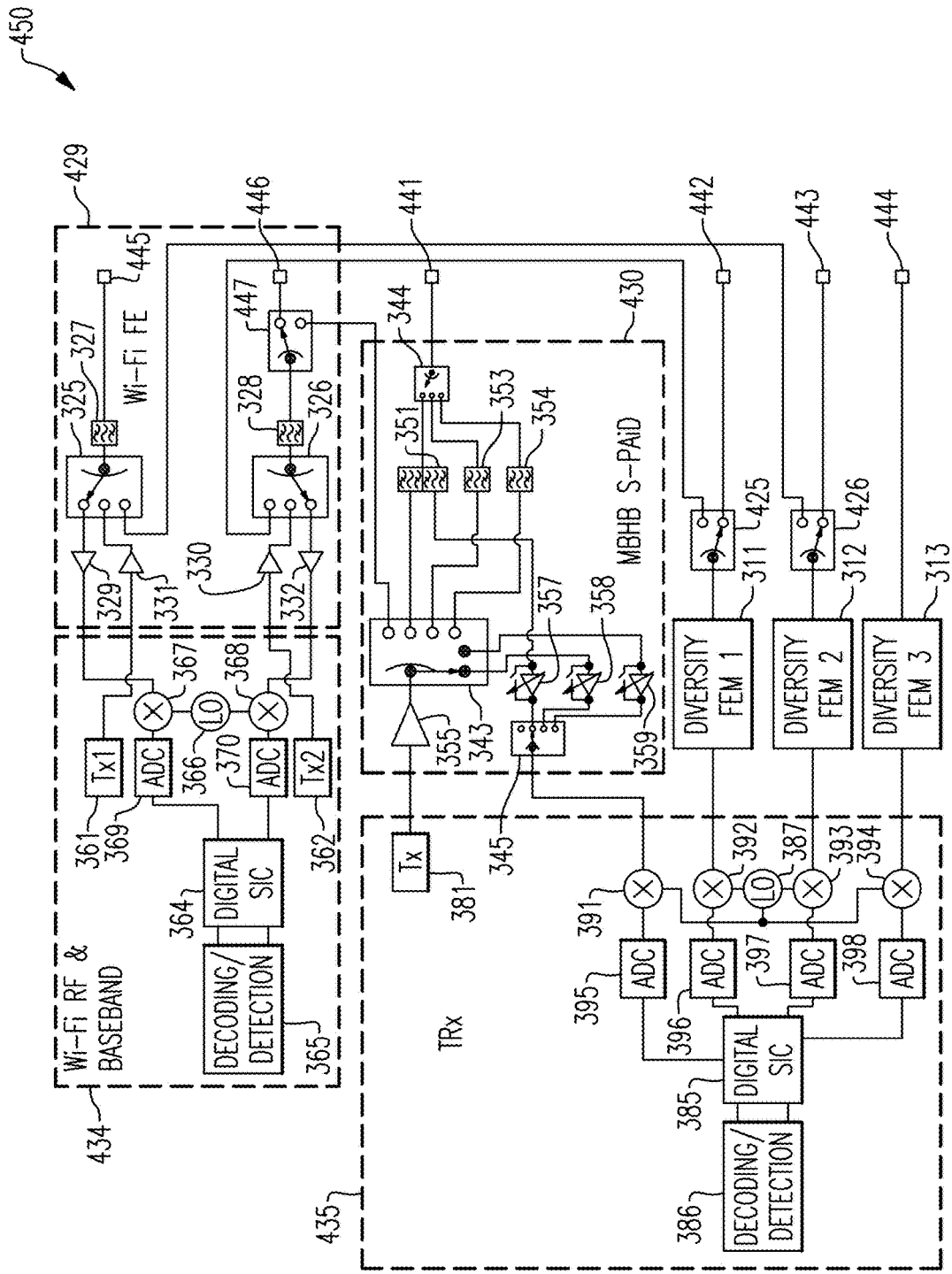
FIG. 7A is a schematic diagram of an RF communication system with interference cancellation according to another embodiment.

FIG. 7A is a schematic diagram of an RF communication system 450 with interference cancellation according to another embodiment. The RF communication system 450 includes a first diversity/feedback switch 425, a second diversity/feedback switch 426, a Wi-Fi front end 429, a cellular front end 430, a first diversity front end 311, a second diversity front end 312, a third diversity front end 313, a Wi-Fi transceiver 434, a cellular transceiver 435, a first antenna port 441, a second antenna port 442, a third antenna port 443, a fourth antenna port 444, a fifth antenna port 445, and a sixth antenna port 446.

Although another embodiment of an RF communication system with interference cancellation is shown, the teachings herein are applicable to RF communications systems implemented in a wide variety of ways.

In comparison to the RF communication system 400 of FIG. 6A, the RF communication system 450 of FIG. 7A uses diversity/MIMO receivers for processing feedback signals rather than including dedicated feedback receivers. For instance, the Wi-Fi transceiver 434 omits the Wi-Fi feedback receiver 363 of FIG. 6A, and the cellular transceiver 435 omits the first cellular feedback receiver 383 and the second cellular feedback receiver 384 of FIG. 6A. Furthermore, in comparison to the RF communication system 400 of FIG. 6A, the RF communication system 450 of FIG. 7A reduces a number of filters used to provide lower cost.

For example, the cellular front end 430 of FIG. 7A is similar to the cellular front end 310 of FIG. 6A, except that the cellular front end 430 omits the feedback filter 341 and the feedback attenuator 342. Additionally, the Wi-Fi front end 429 of FIG. 7A is similar to the Wi-Fi front end 309 of FIG. 6A, except that the Wi-Fi front end 429 further includes a diversity/feedback switch 447 while omitting feedback diplexers 321-322 and feedback attenuators 323-324.

The diversity/feedback switch 447 is used for selectively using diversity/MIMO features or providing a cellular feedback signal to a Wi-Fi diversity path (through the second Wi-Fi filter 328, the second Wi-Fi multi-throw switch 326, and the second LNA 332 to the Wi-Fi transceiver 434, in this example). Thus, when providing feedback from the cellular front end 430 to the Wi-Fi transceiver 434, the second Wi-Fi filter 328 provides filtering to the cellular feedback signal.

With continuing reference to FIG. 7A, the first diversity/feedback switch 425 and/or the second diversity/feedback switch 426 can be selective activated to provide one or more Wi-Fi feedback signals from the Wi-Fi front end 429 to the cellular transceiver 435 by way of one or more diversity front ends.

Thus, rather than including dedicated feedback receivers and filters, receivers and filters used for processing signals from diversity/MIMO branches are reused. Implementing the RF communication system 450 in this manner reduces cost and/or component count at the disadvantage of reducing the number of available paths for diversity/MIMO functions.

In one embodiment, switches used for fast sounding reference signal (SRS) hopping are reused as a diversity/feedback switch. For example, the first diversity/feedback switch 425, the second diversity/feedback switch 426, and/or the diversity/feedback switch 447 can be shared for both fast SRS hopping features.

The RF communication system 450 of FIG. 7A is depicted as including antenna ports 441-446, which can connected to antennas in a wide variety of ways, including, but not limited to, using the antenna and antenna multiplexing configurations of FIG. 6A or 6B. Furthermore, the antenna ports 441-446 can connect to switches for diversity. Such switches can be used, for instance, to switch to any disconnected antennas (for example, when using the first diversity/feedback switch 425, the second diversity/feedback switch 426, and/or the diversity/feedback switch 447 for feedback for coexistence).

The RF communication system 450 of FIG. 7A uses inputs to diversity/MIMO paths for processing feedback signals for interference cancellation. In another embodiment, a feedback signal for interference cancellation is processed using a signal path used for carrier aggregation. For example, a carrier aggregation feature can be disabled in favor of using the carrier aggregation path for processing a feedback signal for interference cancellation.

Figure 7B:
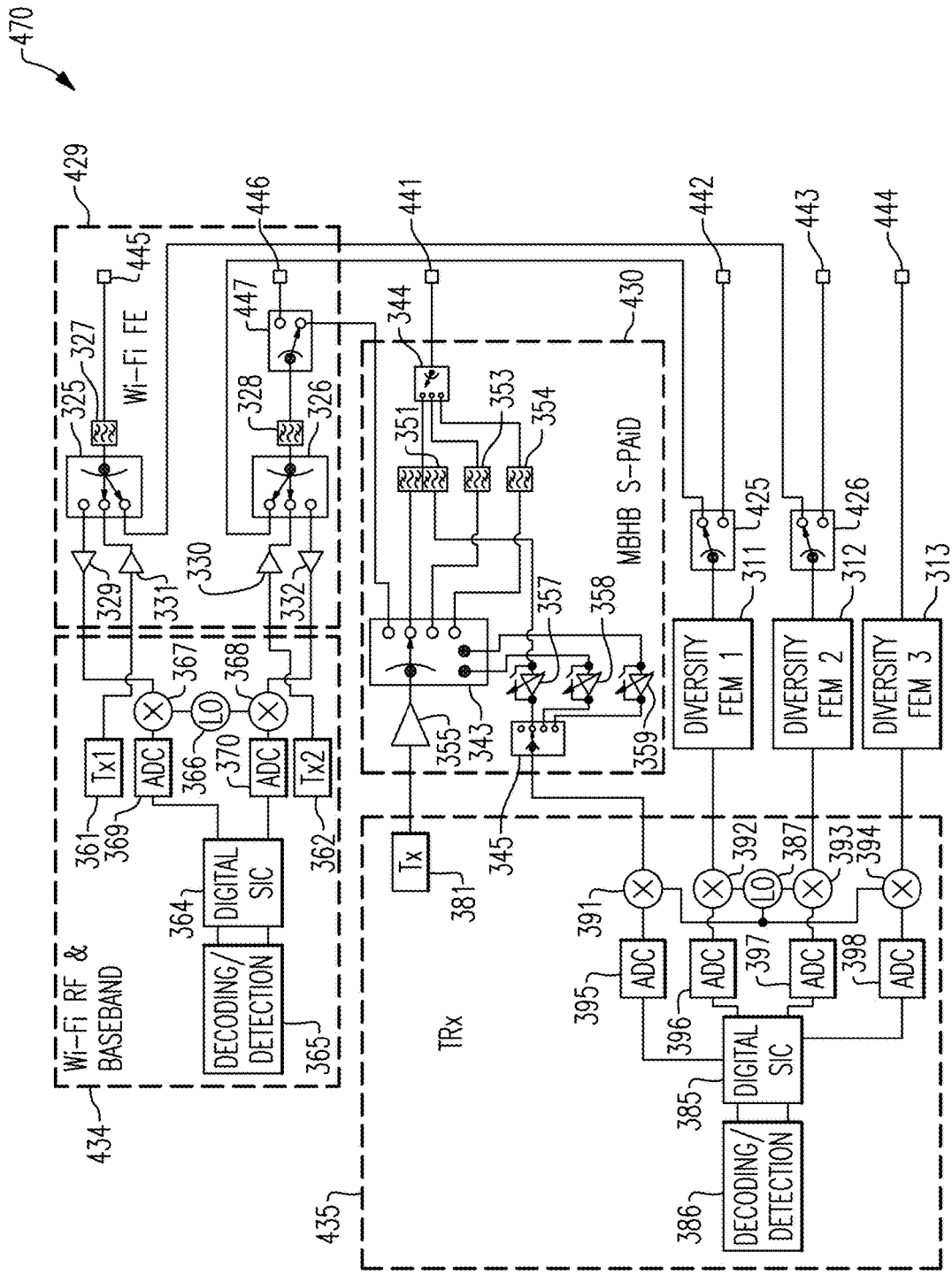
FIG. 7B is a schematic diagram of a first example configuration of switches for the RF communication system of FIG. 7A.

FIG. 7B is a schematic diagram of a first example configuration 450 of switches for the RF communication system 450 of FIG. 7A. The configuration 450 of FIG. 7B shows a setting of switches suitable for providing feedback from the Wi-Fi front end 429 to the cellular transceiver 435. Thus, ACLR or other interference arising from Wi-Fi transmissions can be compensated for using the cellular digital SIC circuit 385.

Figure 7C:
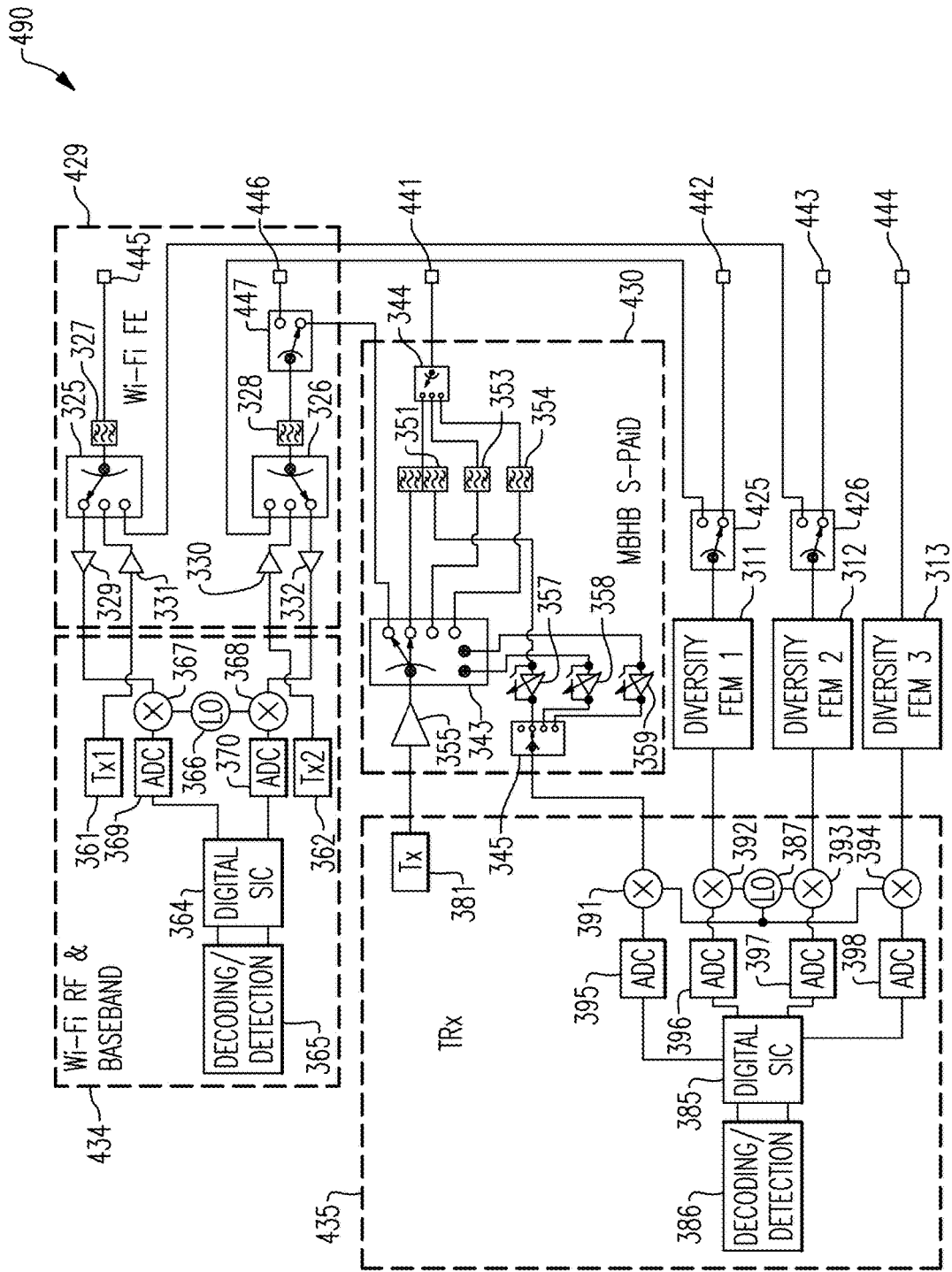
FIG. 7C is a schematic diagram of a second example configuration of switches for the RF communication system of FIG. 7A.

FIG. 7C is a schematic diagram of a second example configuration 490 of switches for the RF communication system 450 of FIG. 7A. The configuration 490 of FIG. 7C shows a setting of switches suitable for providing feedback from the cellular front end 430 to the Wi-Fi transceiver 434. Thus, interference arising from cellular transmissions can be compensated for using the Wi-Fi digital SIC circuit 364.

Figure 8:
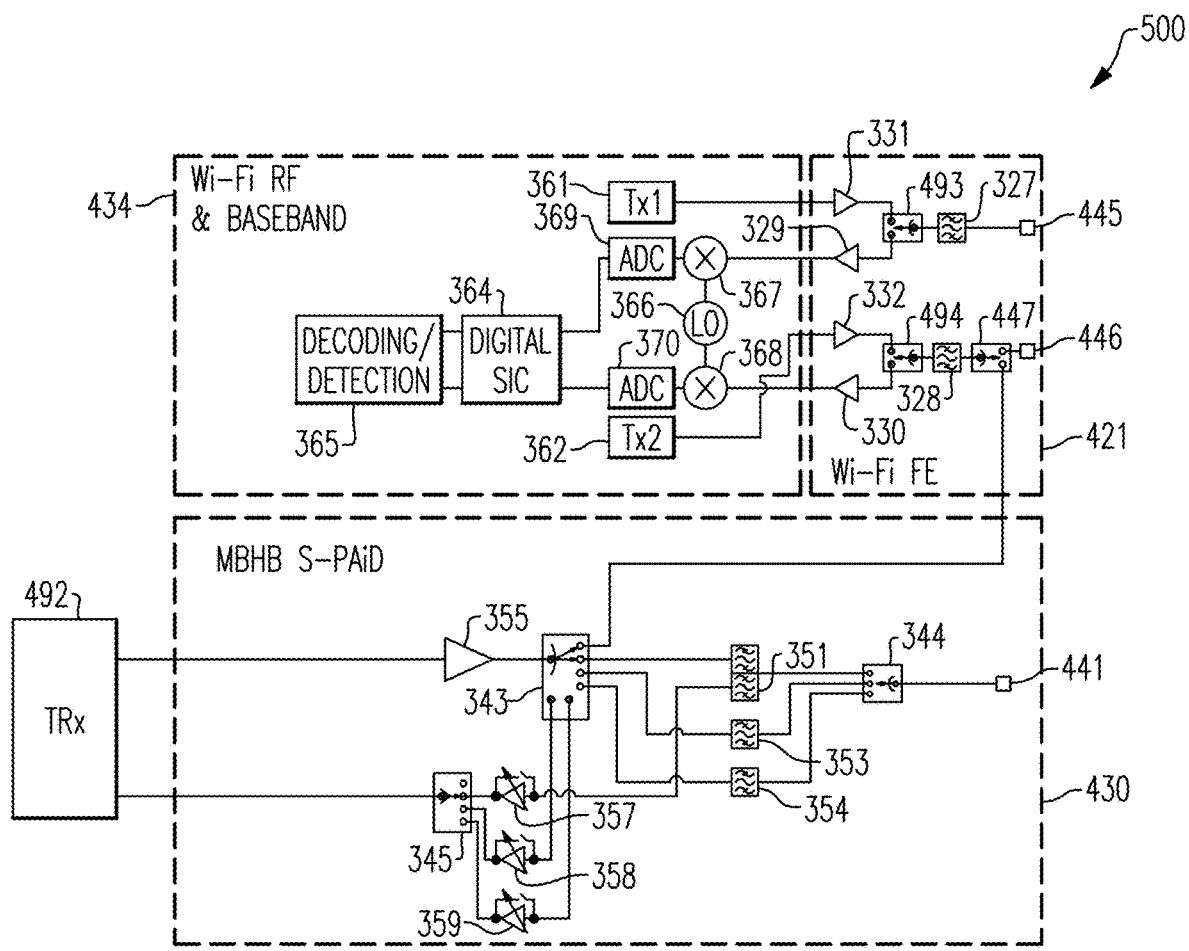
FIG. 8 is a schematic diagram of an RF communication system with interference cancellation according to another embodiment.

FIG. 8 is a schematic diagram of an RF communication system 500 with interference cancellation according to another embodiment. The RF communication system 500 includes a Wi-Fi front end 421, a cellular front end 430, a Wi-Fi transceiver 434, a cellular transceiver 492, a cellular antenna port 441, a first Wi-Fi antenna port 445, and a second Wi-Fi antenna port 446.

Although another embodiment of an RF communication system with interference cancellation is shown, the teachings herein are applicable to RF communications systems implemented in a wide variety of ways.

The RF communication system 500 illustrates a low cost system implemented with cancellation of cellular transmit interference into Wi-Fi receives paths.

For example, the Wi-Fi front end 421 includes a first Wi-Fi filter 327, a second Wi-Fi filter 328, a first Wi-Fi LNA 329, a second Wi-Fi LNA 330, a first Wi-Fi power amplifier 331, a second Wi-Fi power amplifier 332, a first Wi-Fi T/R switch 493, a second Wi-Fi T/R switch 494, and a diversity/feedback switch 447. Additionally, when interference cancellation is enabled, the diversity/feedback switch 447 provides the feedback signal from the cellular front end 430 to Wi-Fi transceiver 434 by way of the second Wi-Fi filter 328, the second Wi-Fi T/R switch 494, and the second Wi-Fi LNA 330.

Figure 9A:
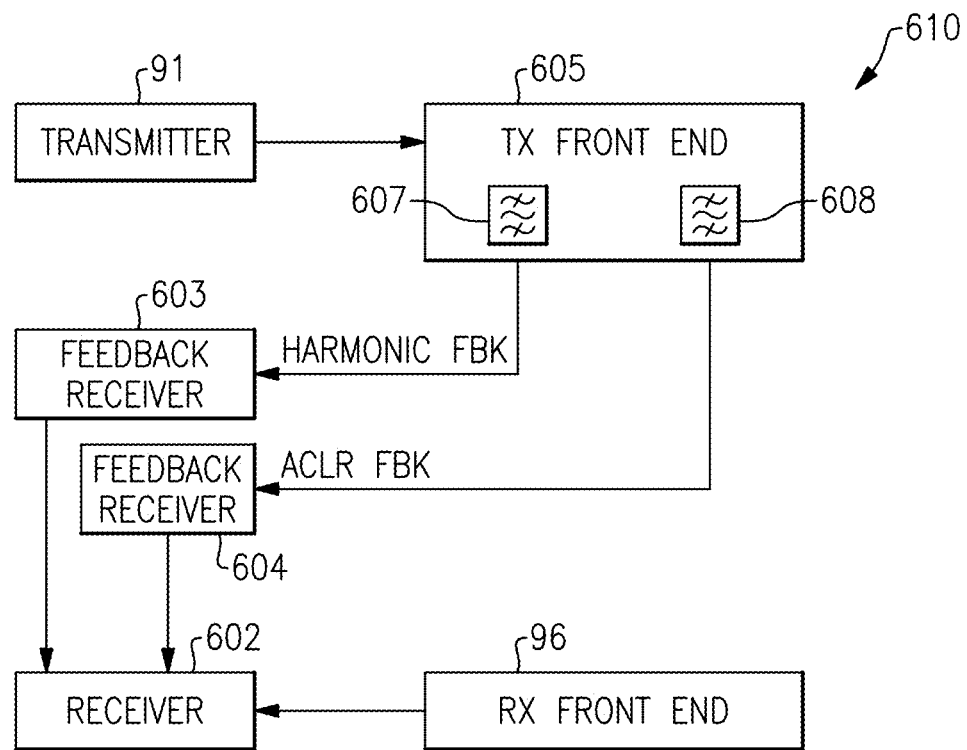
FIG. 9A is a schematic diagram of an RF communication system with interference cancellation according to another embodiment.

FIG. 9A is a schematic diagram of an RF communication system 610 with interference cancellation according to another embodiment. The interference cancellation circuit 610 includes a transmitter 91, a receiver 602, a first feedback receiver 603, a second feedback receiver 604, a transmit front end circuit 605, and a receive front end circuit 96.

The transmitter 91 operates to transmit a transmit signal through the transmit front end circuit 605. Additionally, the receiver 602 processes a receive signal from the receive front end circuit 96.

As shown in FIG. 9A, the transmit front end circuit 605 includes a first filter 607 for generating a first feedback signal for the first feedback receiver 603 and a second filter 608 for generating a second feedback signal for the second feedback receiver 604. The first feedback receiver 603 processes the first feedback signal to generate a first digital interference cancellation signal, and the second feedback receiver 604 processes the second feedback signal to generate a second digital interference cancellation signal. Additionally, the receiver 602 processes the first digital interference cancellation signal and the second digital interference cancellation signal to compensate the receiver 602 for interference arising from the transmitter 91.

In the illustrated embodiment, multiple feedback signals are used for interference cancellation. For example, the first feedback signal can provide harmonic feedback while the second feedback signal can provide ACLR feedback.

The first filter 607 and the second filter 608 serve to filter the transmit signal to sense a desired portion of the frequency spectrum of the transmit signal for processing by the first feedback receiver 603 and the second feedback receiver 604, respectively. In certain implementations, the feedback signals are filtered to remove carrier frequency content, thereby easing linearity constraints of the feedback receivers.

The main receiver 602 processes the digital interference cancellation signals to compensate a main digital receive signal for interference.

In certain implementations, the transmitter 91 and the transmit front end circuit 608 can process RF signals of a different type than the receiver 602 and the receive front end circuit 96. For example, the teachings herein are applicable to a wide range of multi-RAT systems, including, but not limited to, those operating using a combination of two or more of 4G, 5G NR, WLAN, WPAN, WMAN, and/or GPS.

In certain implementations, the transmit front end circuit 605 and the receive front end circuit 96 communicate using separate antennas. In other implementations, the transmit front end circuit 605 and the receive front end circuit 96 communicate using a shared antenna.

Figure 9B:
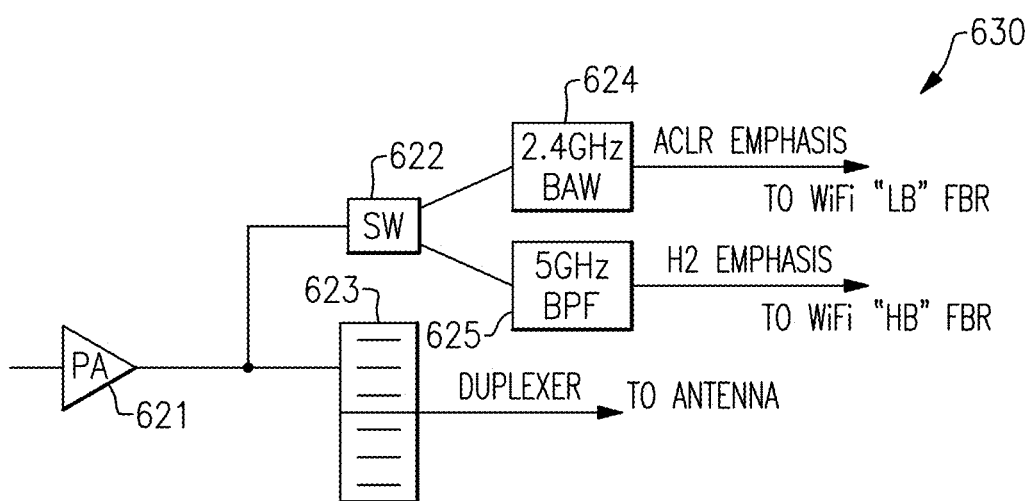
FIG. 9B is a schematic diagram of a front end system providing multiple feedback signals for interference cancellation according to one embodiment.

FIG. 9B is a schematic diagram of a front end circuit 630 providing multiple feedback signals for interference cancellation according to one embodiment. The front end circuit 630 includes a cellular power amplifier 621, a switch 622, a duplexer 623, a 2.4 GHz BAW filter 624, and a 5 GHz bandpass filter 625. The BAW filter 624 outputs a first feedback signal with ACLR emphasis for processing by a low band Wi-Fi feedback receiver, while the band pass filter 625 outputs a second feedback signal with second harmonic emphasis for processing by a high band Wi-Fi feedback receiver.

Thus, cellular H2 is estimated on top of ACLR. In certain implementations, the first feedback signal and the second feedback signal are processed by feedback receivers used for multiple functions. For instance, a low band Wi-Fi diversity receiver can process the first feedback signal, while a high band Wi-Fi diversity receive can process the second feedback signal. Thus, existing feedback receivers of a Wi-Fi chip can be utilized.

Although shown in the context of cellular and Wi-Fi coexistence, multiple feedback signals can be used in a wide variety of contexts, including, but not limited to, harmonics of cellular bands that fall into the filter bands of other cellular bands.

Figure 10A:
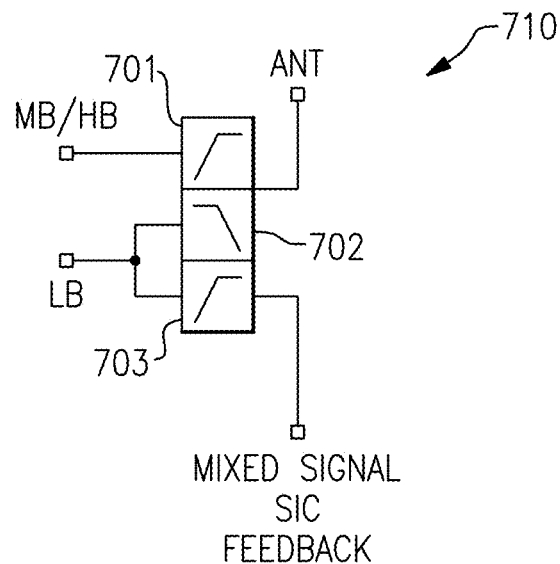
FIG. 10A is a schematic diagram of an antenna multiplexer according to one embodiment.

FIG. 10A is a schematic diagram of an antenna multiplexer 710 according to one embodiment. The antenna multiplexer 710 is also referred to herein as an antennaplexer.

In the illustrated embodiment, the antenna multiplexer 710 includes a first section 701 and a second section 702 that serve as a diplexer to an antenna connected to an antenna terminal (ANT). For example, the first section 701 is connected to a mid band/high band terminal (MB/HB) and operates to pass RF signals of mid band and high band frequencies. Additionally, the second section 702 is connected to a low band terminal (LB) and operates to pass RF signals of low band frequencies.

Thus, the antenna multiplexer 710 handles RF signals of one or more low bands (for example, RF signal bands having a frequency content of 1 GHz or less, also referred to herein as LB), one or more mid bands (for example, RF signal bands having a frequency content between 1 GHz and 2.3 GHz, also referred to herein as MB), and one or more high bands (for example, RF signal bands having a frequency content between 2.3 GHz and 3 GHz, also referred to herein as HB).

With continuing reference to FIG. 10A, the antenna multiplexer 710 further includes a third or feedback section 703 that is coupled to the low band terminal and serves to generate a feedback signal for interference cancellation. As shown in FIG. 10A, the feedback section 703 is high pass while the second section 702 is low pass. Thus, the feedback section 703 senses interference outside the low band frequency range.

The antenna multiplexer 710 can be included in any of the RF communication systems herein to generate a feedback signal for interference cancellation.

Thus, the antenna multiplexer 710 outputs a feedback signal. The antenna multiplexer 710 advantageously operates without a need for control signals, and provides a compact and low cost hardware implementation.

Figure 10B:
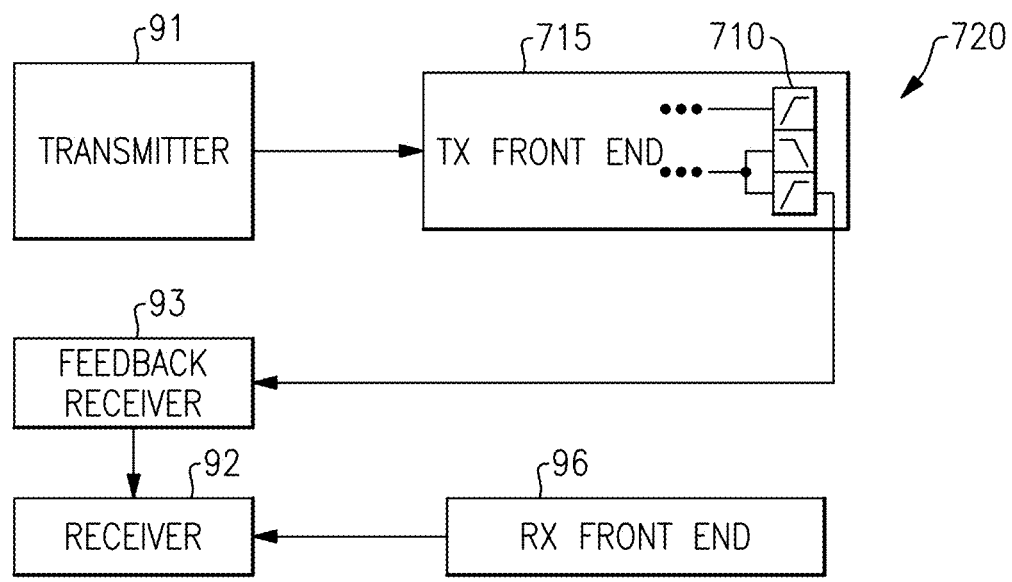
FIG. 10B is a schematic diagram of an RF communication system with interference cancellation according to another embodiment.

FIG. 10B is a schematic diagram of an RF communication system 720 with interference cancellation according to another embodiment. The RF communication system 720 includes a transmitter 91, a receiver 92, a feedback receiver 93, a receive front end circuit 96, and a transmit front end circuit 715.

The RF communication system 720 of FIG. 10B is similar to the RF communication system 100 of FIG. 3, except that the RF communication 720 includes a different implementation of a transmit front end circuit. For example, the transmit front end circuit 715 of FIG. 10B includes the antenna multiplexer 710 for generating the feedback signal for the feedback receiver 93.

Figure 10C:
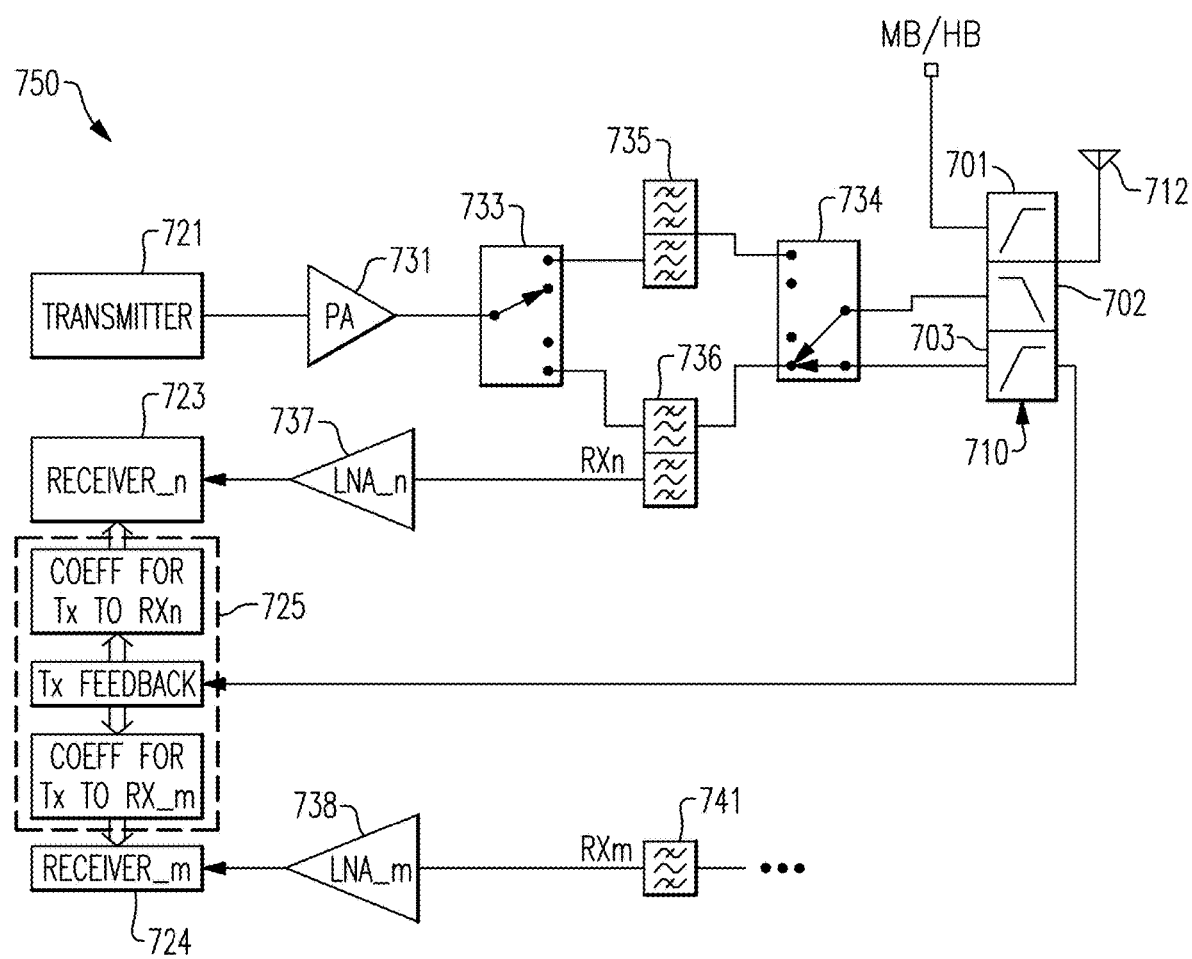
FIG. 10C is a schematic diagram of an RF communication system with interference cancellation according to another embodiment.

FIG. 10C is a schematic diagram of an RF communication system 750 with interference cancellation according to another embodiment. The RF communication system 750 includes an antenna multiplexer 710, an antenna 712, a transmitter 721, a first receiver 723, a second receiver 724, a feedback receiver 725, a power amplifier 731, a first multi-throw switch 733, a second multi-throw switch 734, a first duplexer 735, a second duplexer 736, a first LNA 737, a second LNA 738, and a receive filter 741.

As shown in FIG. 10C, the multi-throw switch 734 serves to selectively connect the duplexer 736 to the feedback section 703 of the antenna multiplexer 710. Thus, when interference cancellation is disabled, the multi-throw switch 734 can deselect the feedback section 703 to avoid insertion loss arising from presence of the feedback section 703.

To enable interference cancellation, the multi-throw switch 734 connects the duplexer 736 to the feedback section 703, thereby providing the feedback signal from the antenna multiplexer 710 to the feedback receiver 725. Additionally, the feedback receiver 725 processes the feedback signal to generate one or more interference cancellation signals, for instance, a first interference cancellation signal for the first receiver 723 and a second interference cancellation signal for the second receiver 724. Such receivers can communicate using the same and/or different antenna(s) as the transmitter 721.

Figure 11:
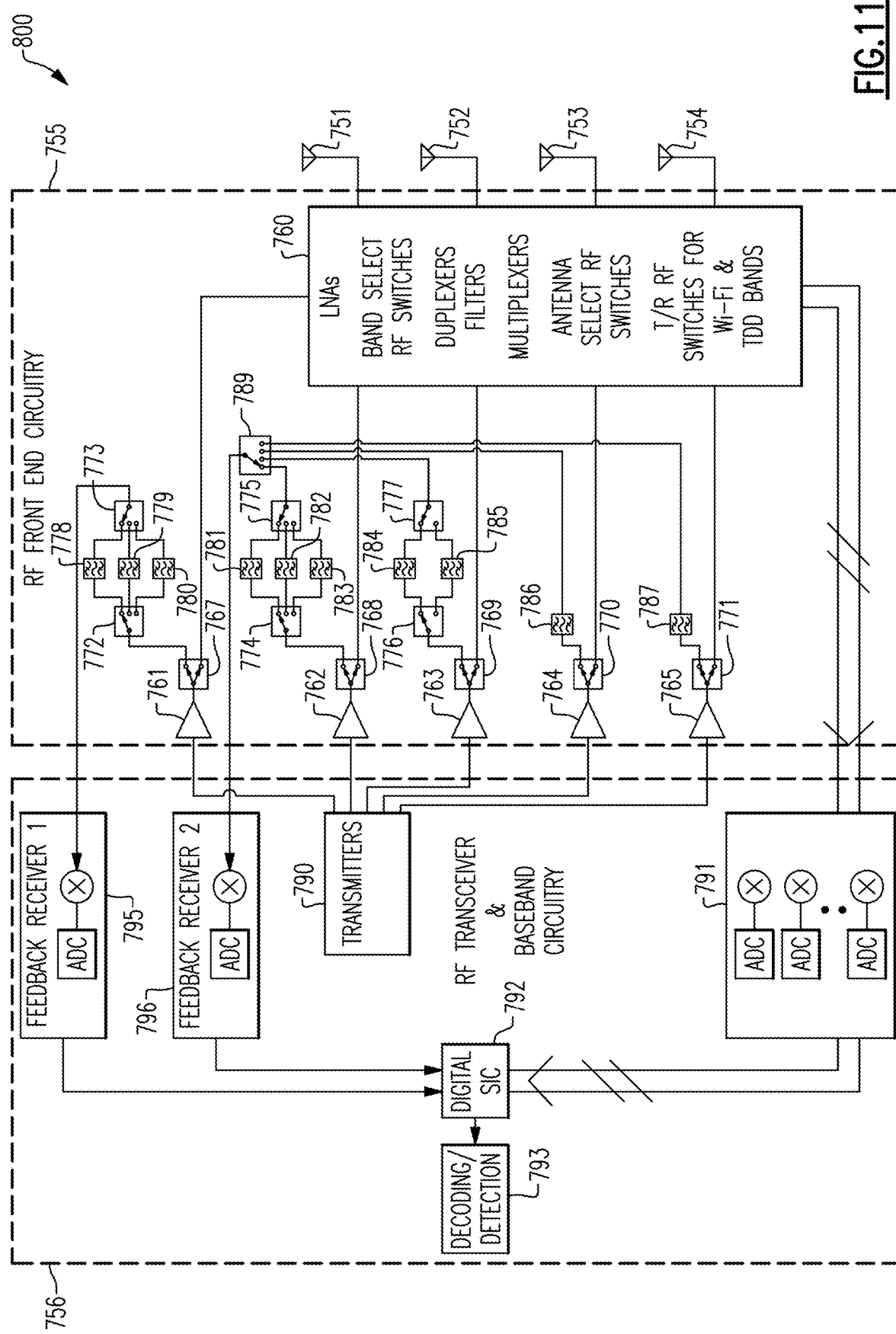
FIG. 11 is a schematic diagram of an RF communication system with interference cancellation according to another embodiment.

FIG. 11 is a schematic diagram of an RF communication system 800 with interference cancellation according to another embodiment. The RF communication system 800 includes a first antenna 751, a second antenna 752, a third antenna 753, a fourth antenna 754, RF front end circuitry 755, and transceiver circuitry 756.

Although another embodiment of an RF communication system with interference cancellation is shown, the teachings herein are applicable to RF communications systems implemented in a wide variety of ways.

In the illustrated embodiment, the RF front end circuitry 755 includes various RF components 760, which can include, for example, LNAs, band select switches, duplexers, filters, multiplexers (for instance, diplexers, triplexers, quadplexers, etc.), antenna selection switches, T/R switches, or some combination thereof. The RF components 760 process signals from one or more of the antennas 751-754 to generate one or more receive signals for the transceiver circuitry 756.

With continuing reference to FIG. 11, the RF front end circuitry 755 further includes a first power amplifier 761, a second power amplifier 762, a third power amplifier 763, a fourth power amplifier 764, a fifth power amplifier 765, a first transmit/feedback switch 767, a second transmit/feedback switch 768, a third transmit/feedback switch 769, a fourth transmit/feedback switch 770, a fifth transmit/feedback switch 771, a first pair of frequency selection switches 772/773, a second pair of frequency selection switches 774/775, a third pair of frequency selection switches 776/777, first to tenth filters 778-787, respectively, and a feedback path selection switch 789.

The RF communication system 800 of FIG. 11 is implemented with flexibility for providing feedback signals of different frequency ranges and/or from different transmit paths. For example, the depicted filters can have different frequency characteristics, thereby allowing desired frequency content to be sensed for interference cancellation. For instance, the first filter 778, the second filter 779, and the third filter 780 can have different filtering characteristics to provide flexibility for controlling frequency content for feedback.

As shown in FIG. 11, the transceiver circuitry 756 includes transmitters 790, main receivers 791, a digital SIC circuit 792, a decoding/detection circuit 793, a first feedback receiver 795, and a second feedback receiver 796. The first feedback receiver 795 receives a first feedback signal sensed from the power amplifier 761 (with a sensed frequency range corresponding to the selected filter). Additionally, the second feedback receiver 796 receives a second feedback signal chosen by the feedback path selection switch 789. Since the feedback path selection switch 789 choses feedback signals sensed from any of the power amplifiers 762-765 (with certain paths including multiple filters for further configurability), enhanced flexibility is provided.

The first feedback receiver 795 outputs a first digital feedback signal to the digital SIC circuit 792, and the second feedback receiver 796 outputs a second digital feedback signal to the digital SIC circuit 792. In accordance with the teachings herein, the digital SIC circuit 792 processes the digital feedback signals to generate digital interference cancellation signals for providing interference cancellation to the receive signals from the main receivers 791. Thus, the compensated receive signals provided from the digital SIC circuit 792 to the decoding/detection circuit 793 can be processed with enhanced accuracy and lower error rate, thereby permitting signal reception close to the noise floor of the main receivers 791.

Figure 12:
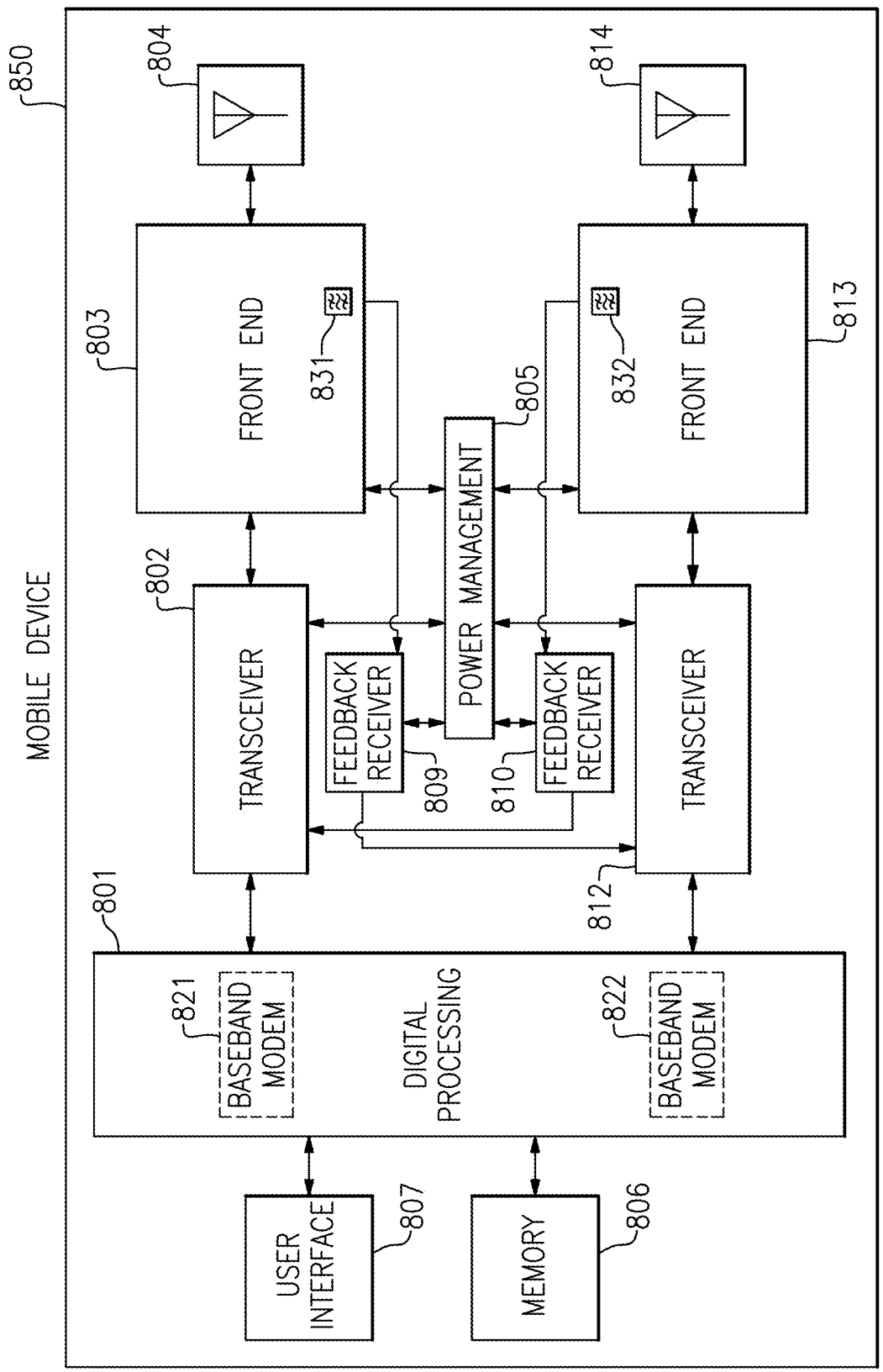
FIG. 12 is a schematic diagram of one embodiment of a mobile device with interference cancellation.

FIG. 12 is a schematic diagram of one embodiment of a mobile device 850 with interference cancellation. The mobile device 850 includes a digital processing system 801, a first transceiver 802, a first feedback receiver 809, a second transceiver 812, a second feedback receiver 810, a first front end system 803, a second front end system 813, a first antenna 804, a second antenna 814, a power management system 805, a memory 806, and a user interface 807. The mobile device 850 can be implemented in accordance with any of the embodiments herein.

The mobile device 850 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

In the illustrated embodiment, the digital processing circuit 801 includes a first baseband modem 821 and a second baseband modem 822. In certain implementations, the first baseband modem 821 and the second baseband modem 822 control communications associated with different types of wireless communications, for instance, cellular and Wi-Fi. As shown in FIG. 12, the first baseband modem 821, the first transceiver 802, and the first front end system 803 operate to transmit and receive RF signals using the first antenna 804. Additionally, the second baseband modem 822, the second transceiver 812, and the second front end system 813 operate to transmit and receive RF signals using the second antenna 814. Although an example with two antennas is shown, the mobile device 850 can include additional antennas including, but not limited to, multiple antennas for cellular communications and/or multiple antenna for Wi-Fi communications.

The first front end system 803 operates to condition RF signals transmitted by and/or received from the first antenna 804. Additionally, the second front end system 804 operates to condition RF signals transmitted by and/or received from the second antenna 814. The front end systems can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 850 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The first antenna 804 and the second antenna 814 can include antenna elements implemented in a wide variety of ways. In certain configurations, the antenna elements are arranged to form one or more antenna arrays. Examples of antenna elements include, but are not limited to, patch antennas, dipole antenna elements, ceramic resonators, stamped metal antennas, and/or laser direct structuring antennas.

In certain implementations, the mobile device 850 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 850 operates with beamforming. For example, the first front end system 803 and/or the second front end system 813 can include phase shifters having variable phase to provide beam formation and directivity for transmission and/or reception of signals. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

The mobile device 850 of FIG. 12 illustrates one embodiment of a mobile device implemented with interference cancellation. For example, the first front end system 803 includes a first filter 831 that generates a first feedback signal, which is processed by the first feedback receiver 809 to generate a digital interference cancellation signal for the second transceiver 812. Additionally, the second front end system 804 includes a second filter 832 that generates a second feedback signal, which is processed by the second feedback receiver 810 to generate a digital interference cancellation signal for the first transceiver 802. Although one example of a mobile device is shown, the teachings herein are applicable a wide range of with interference cancellation schemes.

The digital processing system 801 is coupled to the user interface 807 to facilitate processing of various user input and output (I/O), such as voice and data. The digital processing system 801 provides the transceivers with digital representations of transmit signals, which are processed by the transceivers to generate RF signals for transmission. The digital processing system 801 also processes digital representations of received signals provided by the transceivers. As shown in FIG. 12, the digital processing system 801 is coupled to the memory 806 of facilitate operation of the mobile device 850.

The memory 806 can be used for a wide variety of purposes, such as storing data and/or instructions to facilitate the operation of the mobile device 850 and/or to provide storage of user information.

The power management system 805 provides a number of power management functions of the mobile device 850. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 850, including, for example, a lithium-ion battery.

Applications

Some of the embodiments described above have provided examples in connection with mobile devices. However, the principles and advantages of the embodiments can be used for any other systems or apparatus that have needs for filter bypass. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless device comprising:
a plurality of front end systems including a first front end system and a second front end system; and
a plurality of transceivers including a first transceiver including a transmitter configured to transmit a transmit signal through the first front end system, and a second transceiver including a receiver configured to process a receive signal from the second front end system, the second transceiver further including a first feedback receiver configured to process a first feedback signal from the first front end system to generate a first digital interference cancellation signal and to provide the first digital interference cancellation signal to the receiver for compensating the receive signal for interference arising from the transmitter, and a second feedback receiver configured to process a second feedback signal from the first front end system to generate a second digital interference cancellation signal and to provide the second digital interference cancellation signal to the receiver for compensating the receive signal for interference arising from the transmitter.

2. The wireless device of claim 1 wherein the receiver is configured to process the receive signal to generate a digital receive signal, and to generate a compensated digital receive signal based on digitally compensating the digital receive signal with the first digital interference cancellation signal.

3. The wireless device of claim 1 wherein the first front end system provides the first feedback signal to the first feedback receiver along a feedback path, the first front end system including a multi-throw switch configured to provide the first feedback signal to the feedback path in a first mode, and to disconnect the feedback path in a second mode.

4. The wireless device of claim 1 wherein the first feedback receiver corresponds to a diversity receiver, the wireless device further comprising a switch configured to provide the first feedback signal to the diversity receiver in a first mode and to provide a diversity receive signal to the diversity receiver in a second mode.

5. The wireless device of claim 1 wherein the feedback receiver is dedicated to processing the first feedback signal.

6. The wireless device of claim 1 wherein the first transceiver is one of a cellular transceiver or a Wi-Fi transceiver, and the second transceiver is the other of the cellular transceiver or the Wi-Fi transceiver.

7. The wireless device of claim 1 wherein the first digital interference cancellation signal compensates for interference arising from at least one of adjacent channel leakage, harmonic interference, or intermodulation distortion.

8. The wireless device of claim 1 wherein the first front end system includes a filter configured to output the first feedback signal, the filter is configured to filter a carrier frequency of the transmit signal.

9. The wireless device of claim 1 wherein the first front end system includes a power amplifier configured to amplify the transmit signal to generate an amplified transmit signal, and a coupler and filtering circuit configured to couple a portion of the amplified transmit signal to generate a coupled signal, and to filter the coupled signal to generate the first feedback signal.

10. The wireless device of claim 1 wherein the first feedback signal indicates harmonic interference and the second feedback signal indicates indicated adjacent channel leakage ratio interference.

11. A wireless device comprising:
a plurality of front end systems including a first front end system and a second front end system; and
a plurality of transceivers including a first transceiver including a transmitter configured to transmit a transmit signal through the first front end system, and a second transceiver including a plurality of receivers including a receiver configured to process a receive signal from the second front end system, the second transceiver further including a first feedback receiver configured to process a first feedback signal from the first front end system to generate a first digital interference cancellation signal and to provide the first digital interference cancellation signal to the receiver for compensating the receive signal for interference arising from the transmitter, the first digital interference cancellation signal operable to provide interference cancellation to a plurality of receive signals processed by the plurality of receivers.

12. The wireless device of claim 11 wherein the plurality of receive signals correspond to a plurality of multiple-input multiple-output (MIMO) signals.

13. A method of interference cancellation in a radio frequency communication system, the method comprising:

providing a transmit signal to a first front end system using a transmitter of a first transceiver;
processing a receive signal from a second front end system using a receiver of a second transceiver;
processing a first feedback signal from the first front end system to generate a first digital interference cancellation signal using a first feedback receiver of the second transceiver;
compensating the receive signal for interference arising from the transmitter using the first digital interference cancellation signal;
processing a second feedback signal from the first front end system to generate a second digital interference cancellation signal using a second feedback receiver of the transceiver; and
compensating the receive signal for interference arising from the transmitter using the second digital interference cancellation signal.

14. The method of claim 13 further comprising generating the first feedback signal using a filter of the first front end system, and filtering a carrier frequency of the transmit signal using the filter.

15. The method of claim 13 wherein the first feedback signal indicates harmonic interference and the second feedback signal indicates adjacent channel leakage ratio interference.

16. The method of claim 13 further comprising using a multi-throw switch to provide the first feedback signal to the first feedback receiver along a feedback path in a first mode, and disconnecting the feedback path in a second mode.

17. The method of claim 13 wherein the first feedback receiver corresponds to a diversity receiver, the method further comprising using a switch to provide the first feedback signal to the diversity receiver in a first mode and to provide a diversity receive signal to the diversity receiver in a second mode.

18. The method of claim 13 wherein the second transceiver includes a plurality of receivers including the receiver, the method further comprising providing interference cancellation to a plurality of receive signals processed by the plurality of receivers using the first digital interference cancellation signal.

19. The method of claim 18 wherein the plurality of receive signals correspond to a plurality of multiple-input multiple-output (MIMO) signals.

20. The method of claim 13 further comprising amplifying the transmit signal to generate an amplified transmit signal using a power amplifier of the first front end system, coupling a portion of the amplified transmit signal to generate a coupled signal, and filtering the coupled signal to generate the first feedback signal.

* * * * *